(12) United States Patent
Mitchell

(10) Patent No.: US 11,375,143 B1
(45) Date of Patent: *Jun. 28, 2022

(54) DEVICE FOR NON-UNIFORMITY CORRECTION

(71) Applicant: Wavefront Research, Inc., Northampton, PA (US)

(72) Inventor: Thomas A. Mitchell, Arrington, TN (US)

(73) Assignee: Wavefront Research, Inc., Northhampton, PA (US)

(\*) Notice: Subject to any disclaimer, the term of this patent is extended or adjusted under 35 U.S.C. 154(b) by 0 days.

This patent is subject to a terminal disclaimer.

(21) Appl. No.: 17/189,061

(22) Filed: Mar. 1, 2021

Related U.S. Application Data

(63) Continuation of application No. 16/685,653, filed on Nov. 15, 2019, now Pat. No. 10,939,061, which is a continuation of application No. 15/588,899, filed on May 8, 2017, now Pat. No. 10,484,631.

(60) Provisional application No. 62/339,602, filed on May 20, 2016.

(51) Int. Cl.
  *H04N 5/33* (2006.01)
  *H04N 5/365* (2011.01)
  *H04N 17/00* (2006.01)

(52) U.S. Cl.
  CPC ............ *H04N 5/3651* (2013.01); *H04N 5/33* (2013.01); *H04N 5/3655* (2013.01); *H04N 17/002* (2013.01)

(58) Field of Classification Search
  USPC .......................................... 348/164
  See application file for complete search history.

(56) References Cited

U.S. PATENT DOCUMENTS

| | | | | |
|---|---|---|---|---|
| 10,484,631 | B2 * | 11/2019 | Mitchell | H04N 5/3655 |
| 10,939,061 | B2 * | 3/2021 | Mitchell | H04N 17/002 |
| 2005/0029432 | A1 * | 2/2005 | Bacarella | H04N 5/335 250/208.1 |
| 2007/0034814 | A1 * | 2/2007 | Bailey | G02B 26/0833 250/504 R |
| 2013/0147966 | A1 | 6/2013 | Kostrzewa | |
| 2014/0240820 | A1 | 8/2014 | Sitter, Jr. | |
| 2014/0253999 | A1 | 9/2014 | Hegg | |
| 2014/0267763 | A1 | 9/2014 | Neal | |
| 2016/0041113 | A1 | 2/2016 | Pagani | |
| 2016/0223394 | A1 | 8/2016 | Cook | |
| 2017/0336249 | A1 * | 11/2017 | Nguyen | G01J 5/0834 |
| 2018/0003587 | A1 | 1/2018 | Birchfield | |
| 2018/0091749 | A1 | 3/2018 | Cabib | |

\* cited by examiner

*Primary Examiner* — Behrooz M Senfi
(74) *Attorney, Agent, or Firm* — Culhane Meadows PLLC; Orlando Lopez

(57) ABSTRACT

Optical systems that provide non-uniformity correction devices that are capable of providing low radiance level sources.

17 Claims, 28 Drawing Sheets

DEVICE FOR NON-UNIFORMITY CORRECTION

CROSS-REFERENCE TO RELATED APPLICATIONS

This application is a continuation of co-pending U.S. patent application Ser. No. 16/685,653, entitled DEVICE FOR NON-UNIFORMITY CORRECTION, filed on Nov. 15, 2019, which is a continuation of co-pending U.S. patent application Ser. No. 15/588,899, entitled DEVICE FOR NON-UNIFORMITY CORRECTION, filed on May 8, 2017, which claims the benefit of and priority to U.S. Provisional Application No. 62/339,602, entitled DEVICE FOR NON-UNIFORMITY CORRECTION, filed on May 20, 2016, the entire contents of which are incorporated herein by reference for all purposes.

BACKGROUND

These teachings relate to optical systems in which the range of radiances for performing non-uniformity correction or radiometric calibration of the sensor is greatly increased.

Current detector technologies, particularly those operating in the infrared portion of the spectrum, often have significant amounts of non-uniformity, which cause the imagery generated by imaging and hyperspectral imaging sensors to be non-uniform in their output. Current approaches to the correction, or flattening, of this output imagery is accomplished through various non-uniformity correction, more commonly known as NUC, methods, where images of uniform scenes at different radiance levels are used to calculate the response of each pixel in the imagery, and then calculate an array of transformation terms to match the response of each pixel to a uniform average.

For example, in a two-point NUC approach, one would typically expose the sensor to two separate uniform radiance sources and then use the output imagery to calculate an array of individual linear fits to the data. These linear fit terms would then be used to calculate a transform matrix of gain and offset terms, which when applied to the output imagery of the sensor, would result in a uniform image when exposed to those particular radiance sources.

However, since the response of each pixel is typically non-linear to some degree, the true response of the array will depart from the linear mapping of NUC, resulting in spatial noise in the imagery, commonly known as residual fixed pattern noise, or FPN, or RFPN. This additional noise adds to the temporal and system noise of the sensor, reducing its overall sensitivity and detection capability. The further the radiance level the source is from the radiance levels used to calculate the NUC terms, the more FPN that is typically present in the imagery. As a result, it is a common practice to use radiance levels that bracket the range of radiances expected from the scene to minimize the impact of this FPN.

In the visible spectrum, widely spaced radiance levels can be accomplished through the use of a lamp source and a shutter, which can provide both a sufficiently bright source and a very dark source to bracket the radiance levels of a scene. This is not, however, easily accomplished in the longwave infrared, or LWIR, spectrum, where the radiance sources are thermal in nature. Achieving a high radiance source can be accomplished with a warm, high emissivity, blackbody target. The high emissivity reduces any reflected sources from other targets and provides higher radiance levels at lower temperatures. Achieving a low radiance source, however, is more difficult. For example, the radiance output in the LWIR for a target with a temperature of 0° C. is only half that of a target with a temperature of 40° C. While objects in the scene may be bounded by temperatures over this range, their emissivity can range from very low to very high, resulting in a range of radiance values in the scene from equally very low to very high. To reduce the impact of FNP, there is a need for low radiance sources, and unfortunately reducing the emissivity of a radiance target only increases the amount of transmitted or reflected radiance from sources outside of the target, resulting in inaccurate knowledge of the target radiance as well as eliminating the benefit of the lower emissivity. Operating the radiance source at temperatures below 0° C. presents its own problems in that they cannot be used in the presence of air due to condensation and potential frost on the surface of the source that corrupts its radiance output.

There is therefore a need for a device to provide lower radiance sources for non-uniformity correction than that which is currently available.

SUMMARY

The embodiments of the present teachings provide non-uniformity correction devices that are capable of providing low radiance level sources. More specifically, one or more embodiments of the disclose and describe a first source of electromagnetic radiation, an optical subassembly having at least one optical element; the optical subassembly being configured to substantially receive a portion of the electromagnetic radiation from said first source, a detector, an environmental device substantially capable of providing an operating environment suitable for the detector, the environmental device being substantially capable of receiving a portion of the electromagnetic radiation from said optical subassembly, the detector being substantially capable of receiving a portion of the electromagnetic radiation transmitted by said environmental device, a second source of electromagnetic radiation, the second source being disposed within the operating environment of said environmental device, and the detector being substantially capable of receiving electromagnetic radiation from the second source.

DETAILED DESCRIPTION

Figure 1A:
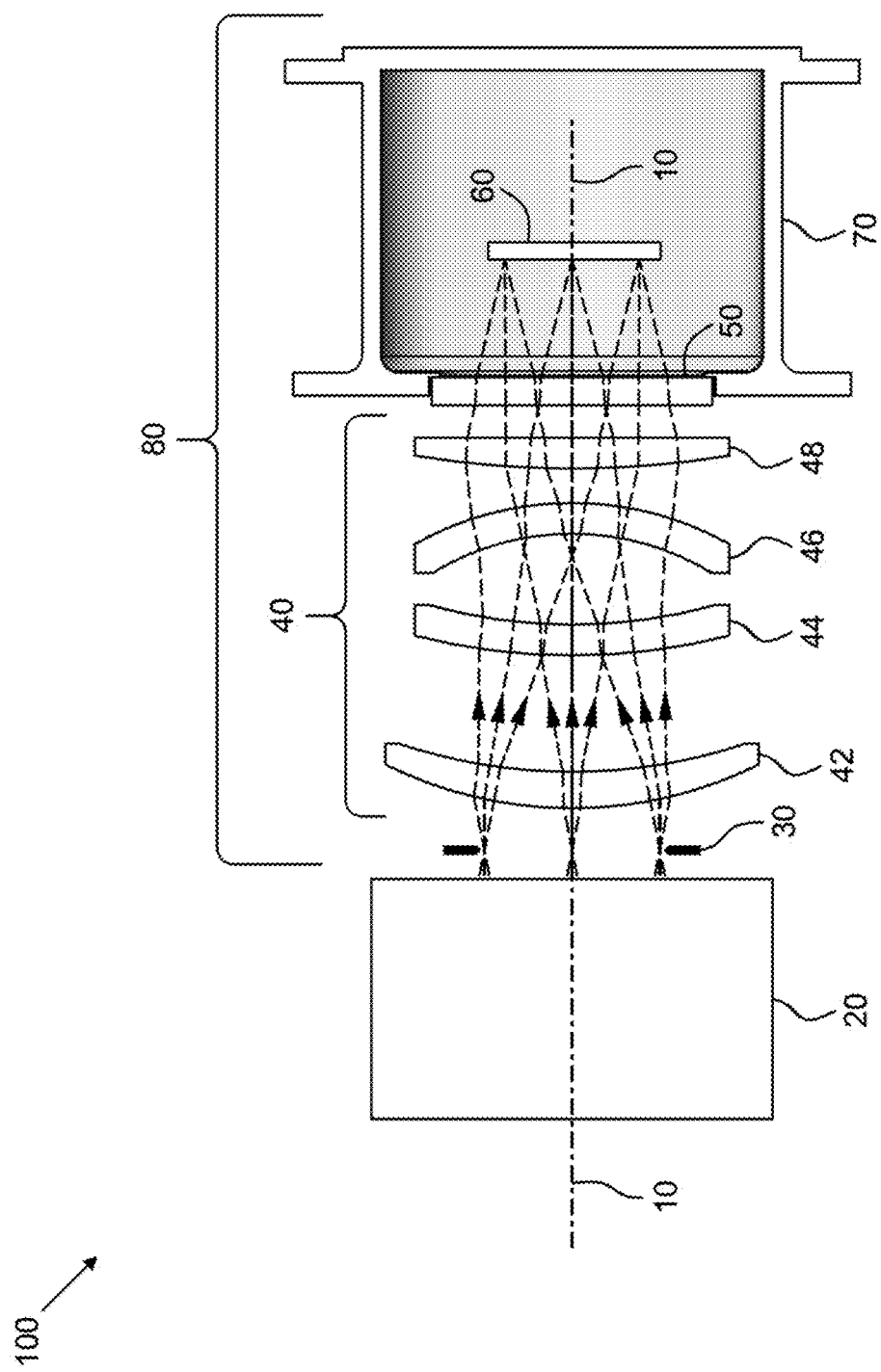
FIG. 1A is a schematic view of an imaging optical system taken along the plane containing its optical axis.

Reference is made to FIG. 1A, which is a schematic view of an optical imaging system 100 taken along the plane containing its optical axis 10. In operation, electromagnetic radiation, typically in the ultraviolet, visible, and/or infrared bands, hereinafter referred to generally as light, emitted or reflected by a given object, such as but not limited to a blackbody radiator, hereinafter referred to generally as the source 20, is incident onto an optical system 80. Light emitted by the source is incident onto an entrance pupil 30, which is capable of substantially receiving a portion of the light from the source. The light is then incident onto an imaging optical system 40, in this embodiment made up of, but not limited to, four refractive elements 42, 44, 46, and 48, which is capable of substantially receiving a portion of the light from the entrance pupil 30. The light is then incident upon an optical window 50, which is capable of substantially receiving a portion of the light from the imaging optical system 40. The light is then substantially focused onto a focus position (hereinafter also referred to as an image plane, which is typically planar, but without loss of generality may also be a curved or other non-planar surface) of a CCD array, CMOS imager, phosphorescent screen, photographic film, microbolometer array, or other means of detecting light energy, hereinafter referred to generally as a detecting element 60. The detecting element 60 is located within a Dewar or other means of providing an operating environment, hereinafter referred to generally as a Dewar 70.

Figure 1B:
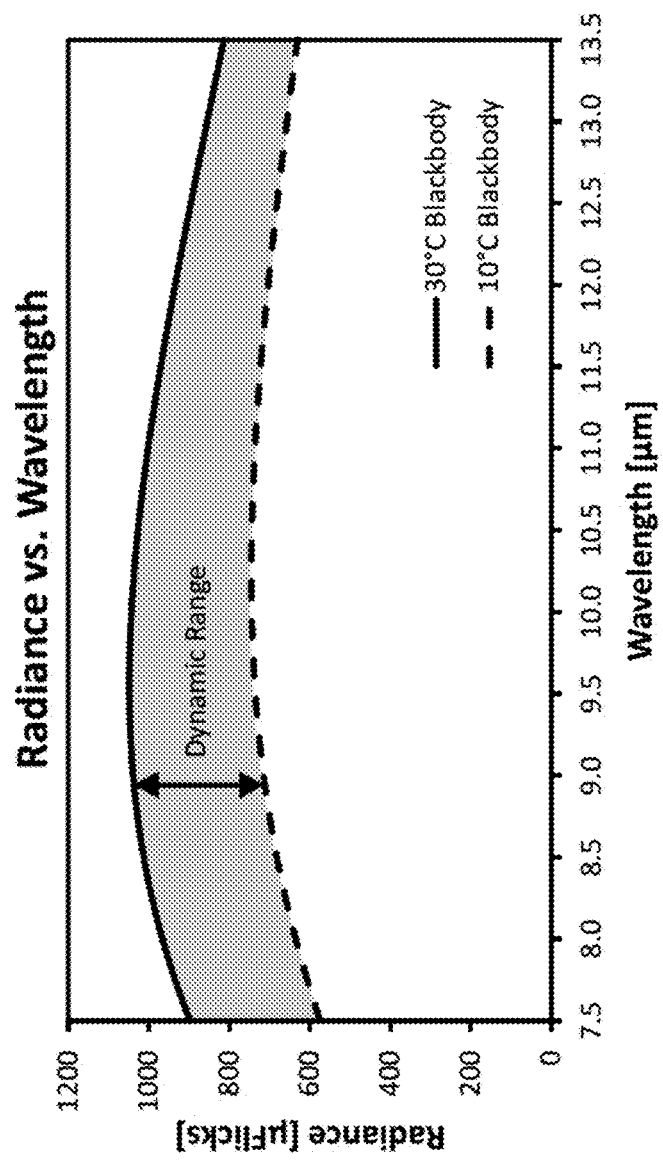
FIG. 1B illustrates the dynamic range in radiance for two blackbody sources.

Reference is made to FIG. 1B which illustrates for the case of a long wave infrared imaging system the radiance of a typical blackbody source operating at temperatures of 10 and 30° C. From this illustration, it can be seen that this range of source temperatures provides only a small range of radiances for performing non-uniformity correction or radiometric calibration of the sensor.

Figure 2:
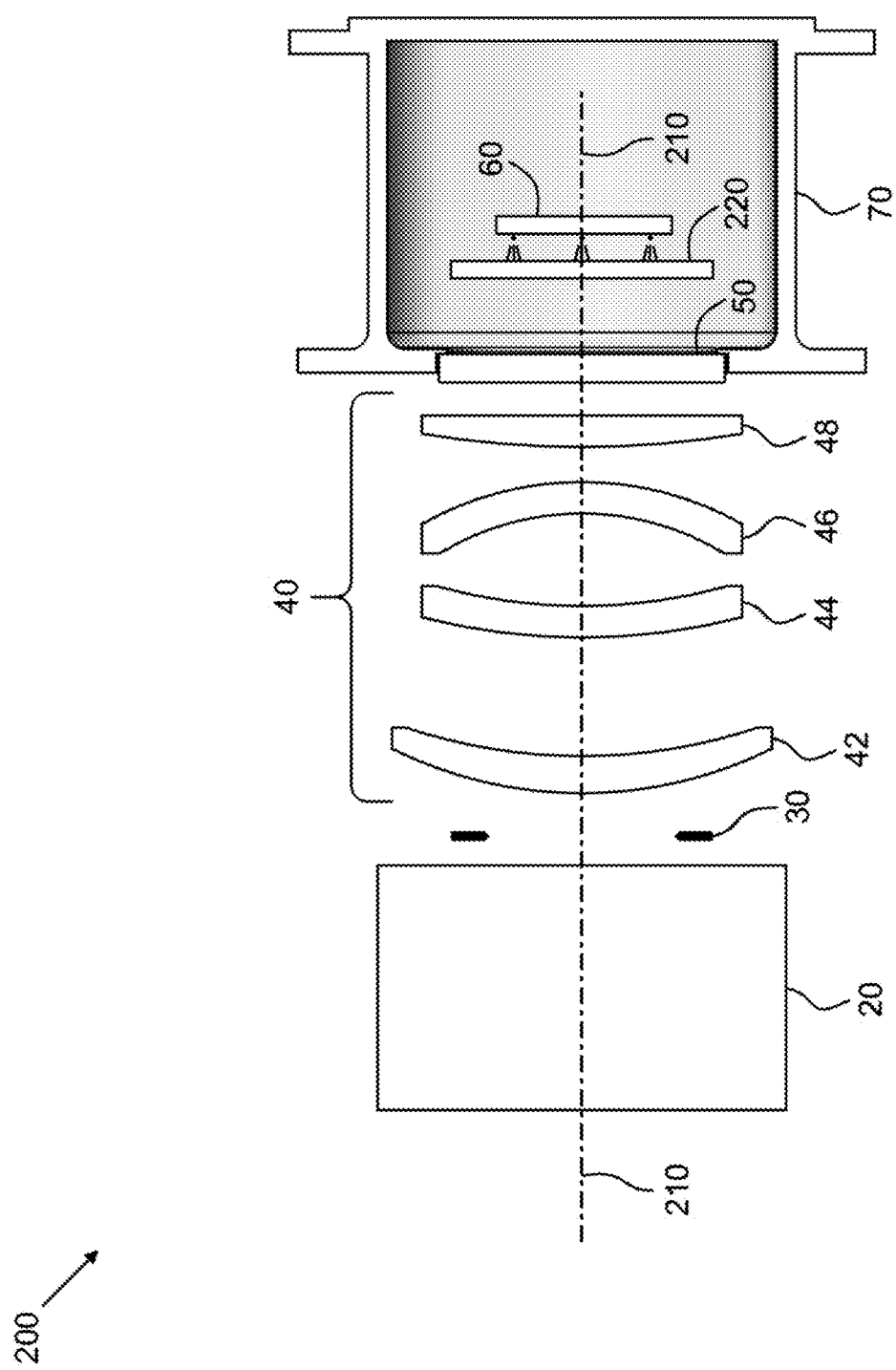
FIG. 2 is a schematic view of an embodiment of the present invention, taken along the plane containing its optical axis.

Reference is made to FIG. 2, which is a schematic view of an embodiment of the present invention 200 taken along the plane containing its optical axis 210. In operation, a source element, such as but not limited to an emissive plate or blackbody, hereinafter referred to generally as a source element 220, is located within the environment of the Dewar 70 such that its temperature is substantially decreased relative to the temperature outside of the Dewar 70. The source element is optically disposed in front of the detecting element 60, typically in a configurable manner by means of, but not limited to, a translational, rotational, or flip mechanism, such that light emitted by the source 220 is incident onto the detecting element 60.

Figure 3:
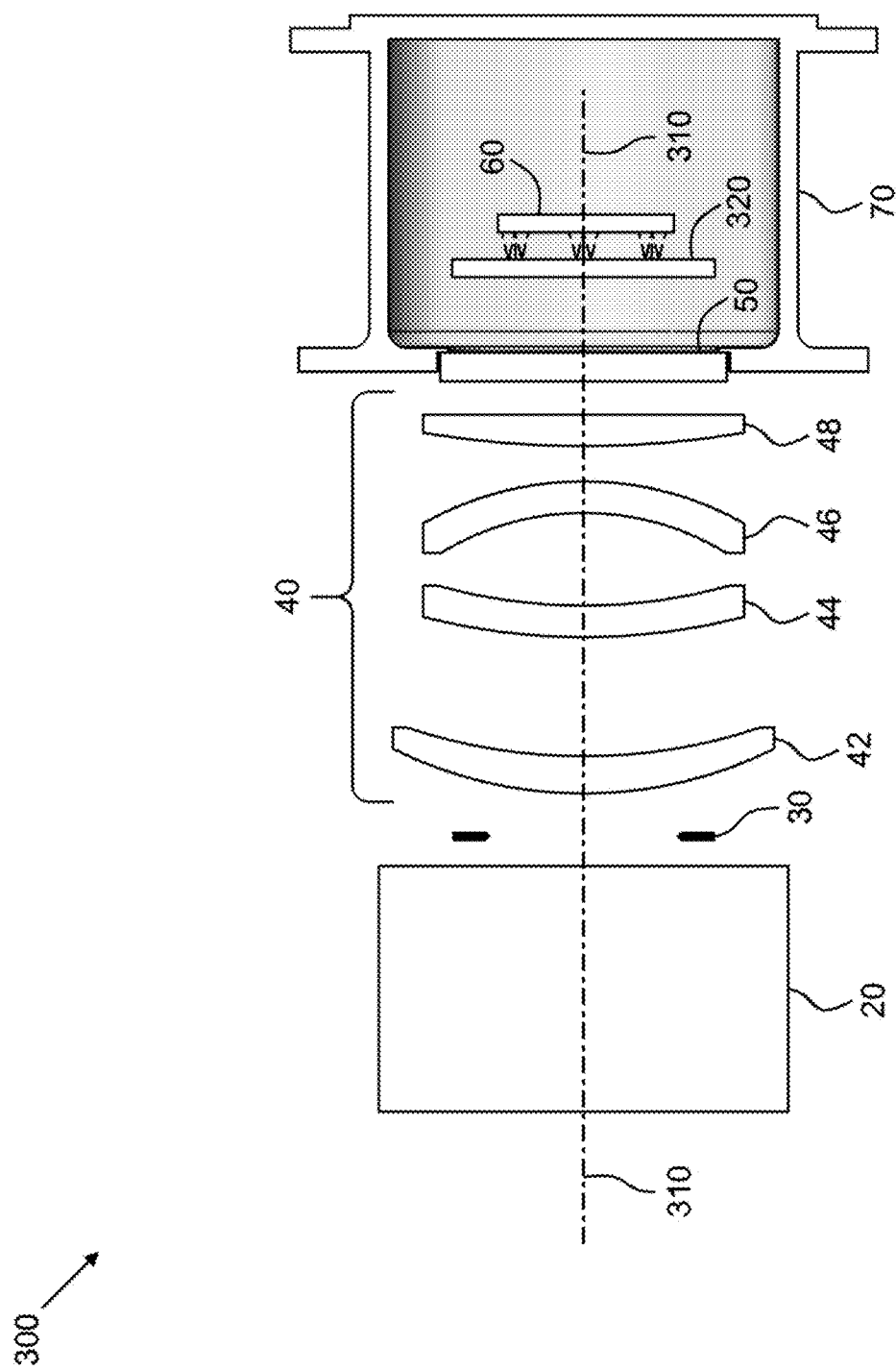
FIG. 3 is a schematic view of a further embodiment of the present invention, taken along the plane containing its optical axis.

Reference is made to FIG. 3, which is a schematic view of another embodiment of the present invention 300 taken along the plane containing its optical axis 310. In operation, a reflective element, such as but not limited to a mirror, hereinafter referred to generally as a reflective source element 320, is located within the environment of the Dewar 70 and optically disposed in front of the detecting element 60, typically in a configurable manner by means of, but not limited to, a translational, rotational, or flip mechanism, or by electro-optical means such as a switchable diffractive mirror or MEMS device, such that light emitted by cold objects located within the Dewar 70, including but not limited to the detecting element 60 itself, is incident onto the reflecting element 320, which is capable of receiving a portion of the light and reflecting it onto the detecting element 60.

Figure 4A:
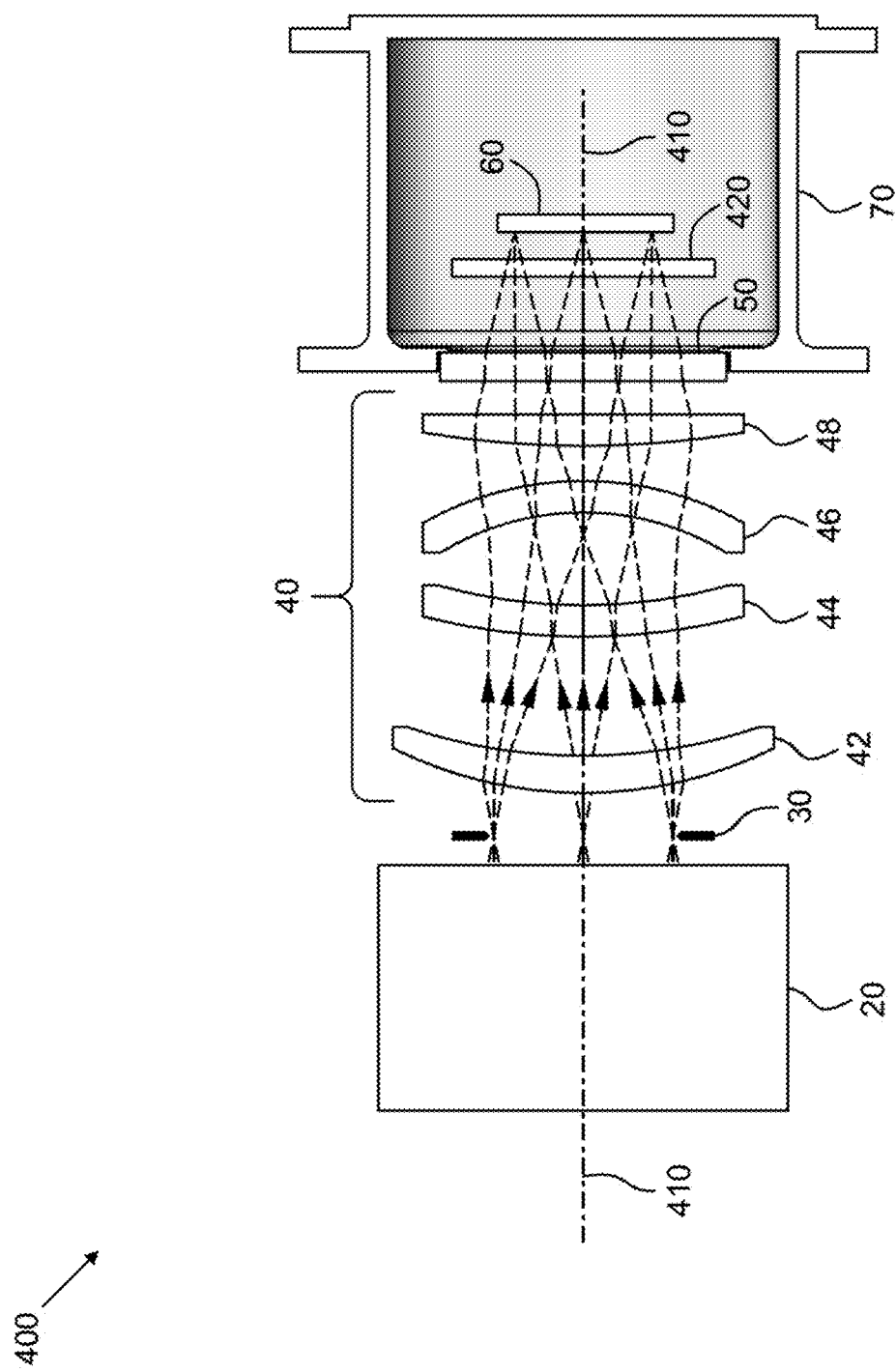
FIG. 4A is a schematic view of a further embodiment of the present invention, taken along the plane containing its optical axis.

Reference is made to FIG. 4A, which is a schematic view of a first configuration of another embodiment of the present invention 400 taken along the plane containing its optical axis 410. In operation, light emitted by the source 20, is incident onto an entrance pupil 30, which is capable of substantially receiving a portion of the light from the source 20. The light is then incident onto an imaging optical system 40, in this embodiment made up of, but not limited to, four refractive elements 42, 44, 46, and 48, which is capable of substantially receiving a portion of the light from the entrance pupil 30. The light is then incident upon an optical window 50, which is capable of substantially receiving a portion of the light from the imaging optical system 40. The light is then incident upon a transmitting optical element, such as but not limited to a window, hereinafter referred to generally as a transmitting source element 420, which is located within the environment of the Dewar 70, optically disposed in front of the detecting element 60, typically in a configurable manner by means of, but not limited to, a translational, rotational, or flip mechanism, or by electro-optical means such as a switchable diffractive window, and capable of substantially receiving a portion of the light from the optical window 50. The light is then substantially focused onto a detecting element 60, which is located within the Dewar 70 and capable of substantially receiving a portion of the light transmitted by the optical element 420.

Figure 4B:
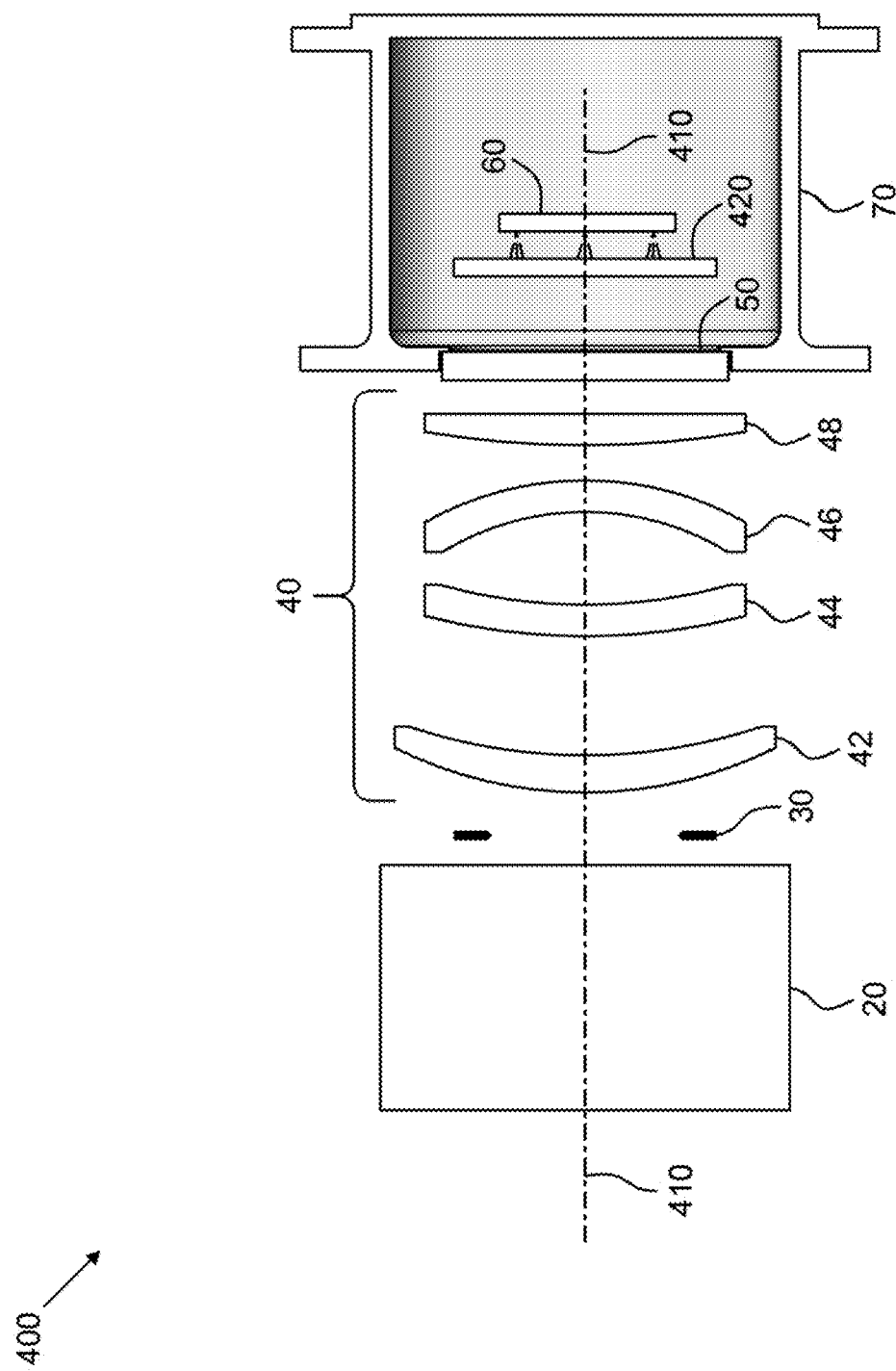
FIG. 4B is a schematic view of the embodiment of the present invention of FIG. 4A, taken along the plane containing its optical axis.

Reference is made to FIG. 4B, which is a schematic view of a second configuration of the embodiment of the present invention 400 illustrated in FIG. 4A taken along the plane containing its optical axis 410. In this embodiment, the optical element 420 can be switched, closed, re-oriented, electrically converted, or otherwise modified to be substantially opaque such that in this configuration light emitted by the optical element 420 is incident onto the detecting element 60.

Figure 4C:
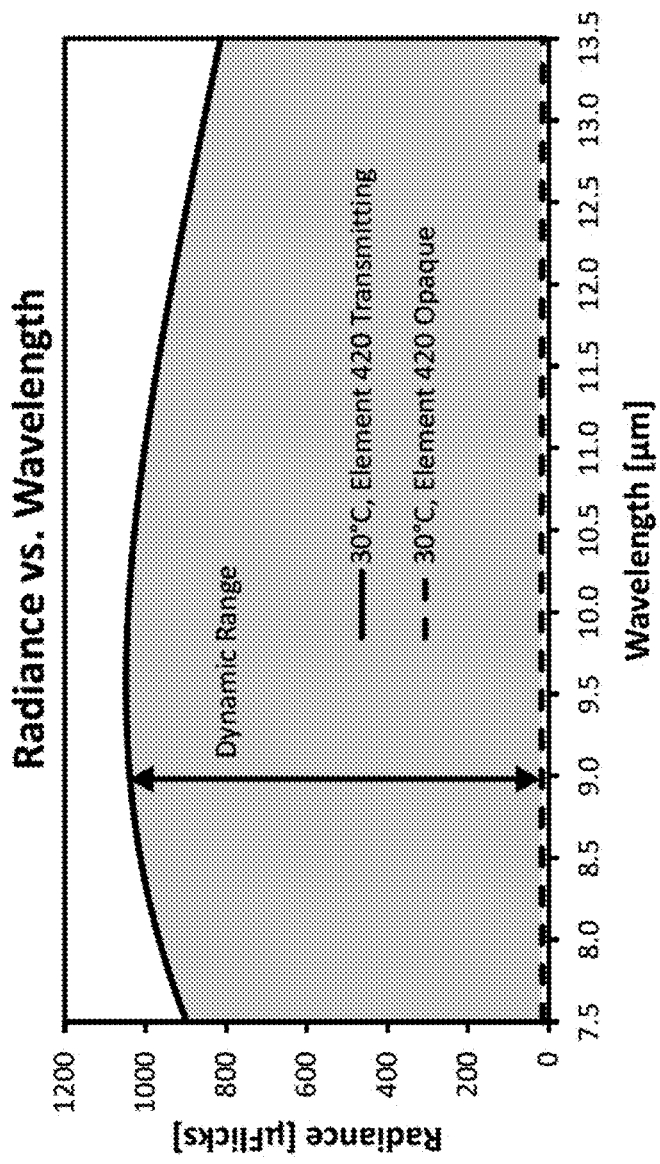
FIG. 4C illustrates the dynamic range in radiance for the embodiment of the present invention of FIG. 4A.

Reference is made to FIG. 4C which illustrates for the case the embodiment of the present invention 400 illustrated in FIGS. 4A and 4B the radiance seen by the detecting element 60 for the source 20 operating at a temperature of 30° C. with the optical element 420 operating in its transparent and opaque configurations. From this illustration, it can be seen that the range of radiances for performing non-uniformity correction or radiometric calibration of the sensor is greatly increased.

Figure 5A:
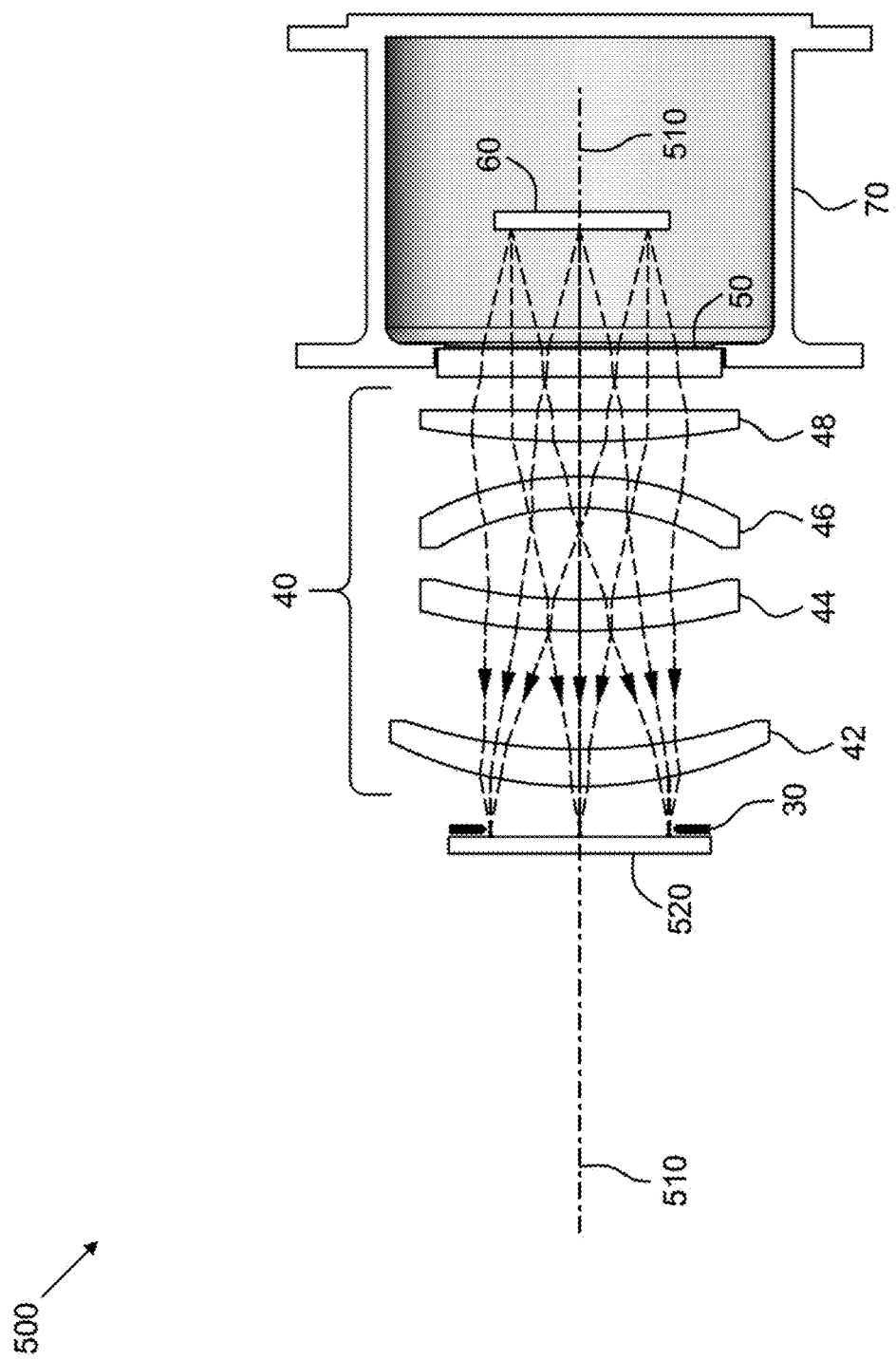
FIGS. 5A and 5B are schematic views of a further embodiment of the present invention, taken along the plane containing its optical axis.

Reference is made to FIG. 5A, which is a schematic view of another embodiment of the present invention 500 taken along the plane containing its optical axis 510. In operation, light emitted by cold objects located within the Dewar 70, including but not limited to the detecting element 60 itself, is incident onto an optical window 50, which is capable of substantially receiving a portion of the light from the cold objects located within the Dewar 70. The light is then incident onto an imaging optical system 40, in this embodiment made up of, but not limited to, four refractive elements 42, 44, 46, and 48, which is capable of substantially receiving a portion of the light from the optical window 50. The light is then incident upon a reflecting element 520, which in this embodiment is optically disposed to be substantially proximate to, but not limited to, an entrance pupil 30 of the imaging optical system 40, and is capable of substantially receiving a portion of the light from the imaging optical system 40 and substantially reflecting the light.

Figure 5B:
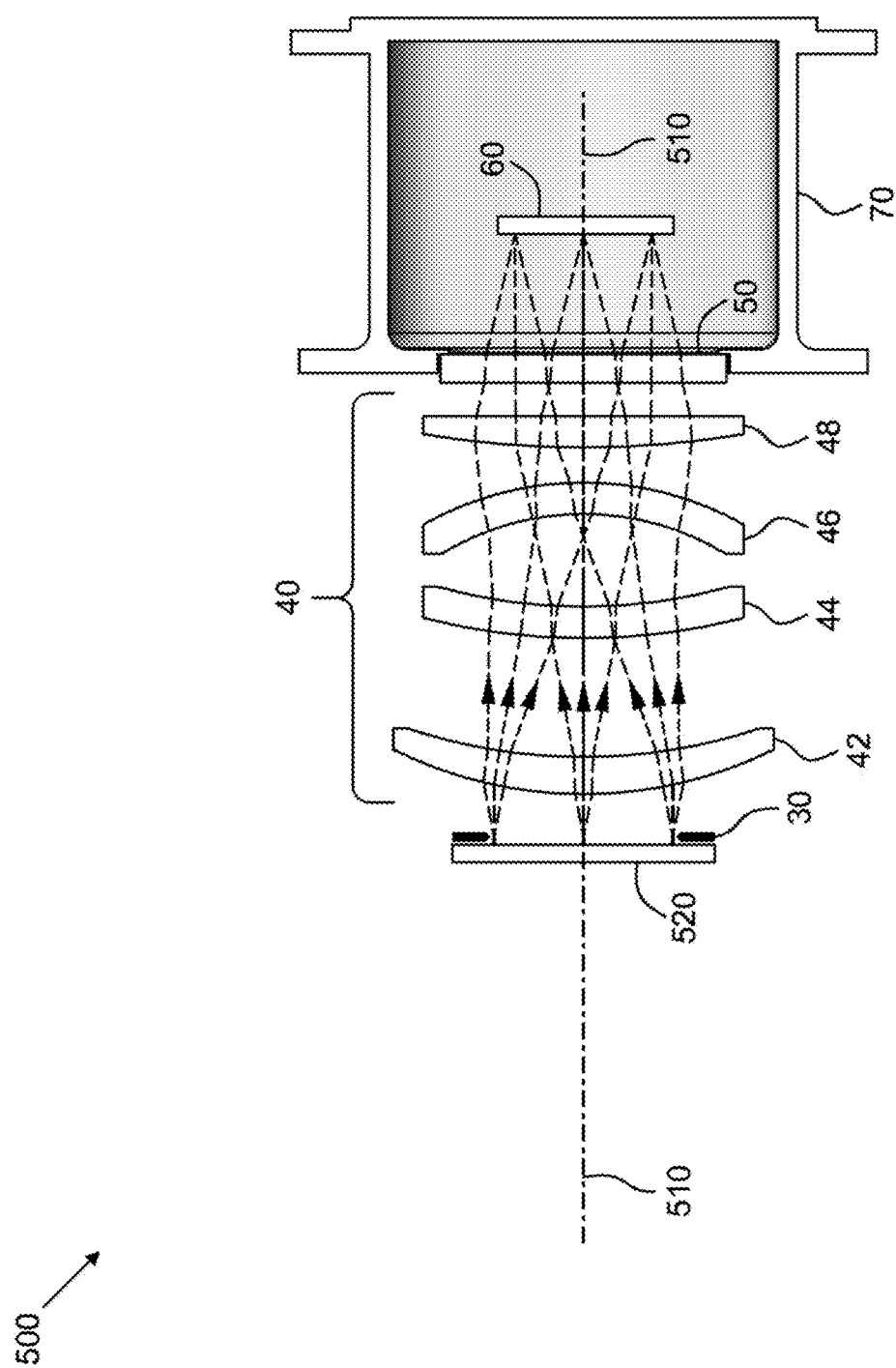

Reference is made to FIG. 5B, which is a schematic view of the present invention 500 illustrated in FIG. 5A taken along the plane containing its optical axis 510. In continuance of its operation, light reflected by the reflecting element 520 is incident onto the imaging optical system 40, which is capable of substantially receiving a portion of the light reflected from the reflecting element 520. The light is then incident upon the optical window 50, which is capable of substantially receiving a portion of the light from the imaging optical system 40. The light is then substantially focused onto the detecting element 60, which is capable of substantially receiving a portion of the light transmitted by the optical window 50.

Figure 6A:
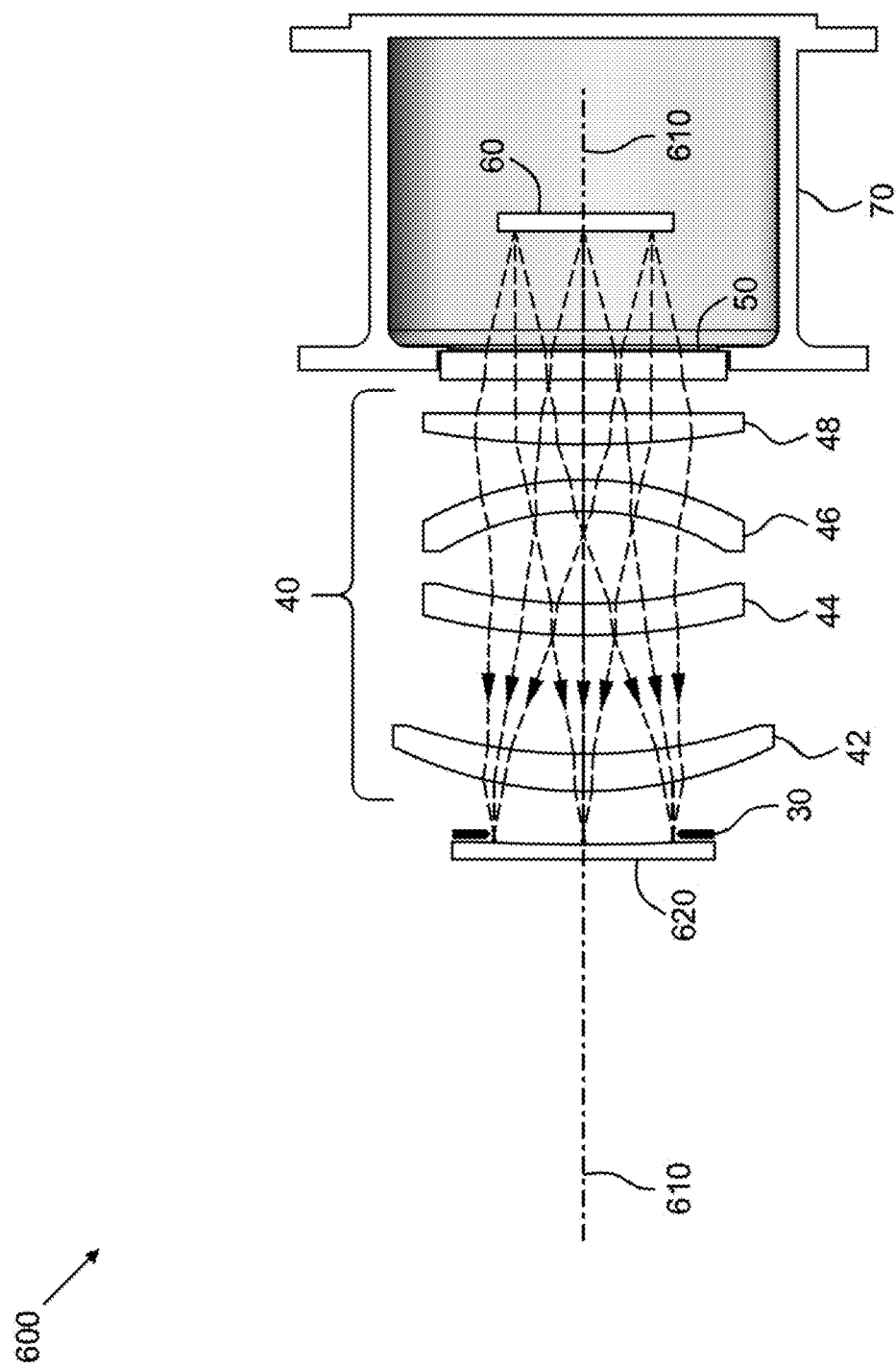
FIGS. 6A and 6B are schematic views of a further embodiment of the present invention, taken along the plane containing its optical axis.

Reference is made to FIG. 6A, which is a schematic view of another embodiment of the present invention 600 taken along the plane containing its optical axis 610. In operation, light emitted by cold objects located within the Dewar 70, including but not limited to the detecting element 60 itself, is incident onto an optical window 50, which is capable of substantially receiving a portion of the light from the cold objects located within the Dewar 70. The light is then incident onto an imaging optical system 40, in this embodiment made up of, but not limited to, four refractive elements 42, 44, 46, and 48, which is capable of substantially receiving a portion of the light from the optical window 50. The light is then incident upon a reflecting element 620, which in this embodiment is optically disposed to be substantially proximate to, but not limited to, an entrance pupil 30 of the imaging optical system 40, has substantially non-zero optical power, and is capable of substantially receiving a portion of the light from the imaging optical system 40 and substantially reflecting the light.

Figure 6B:
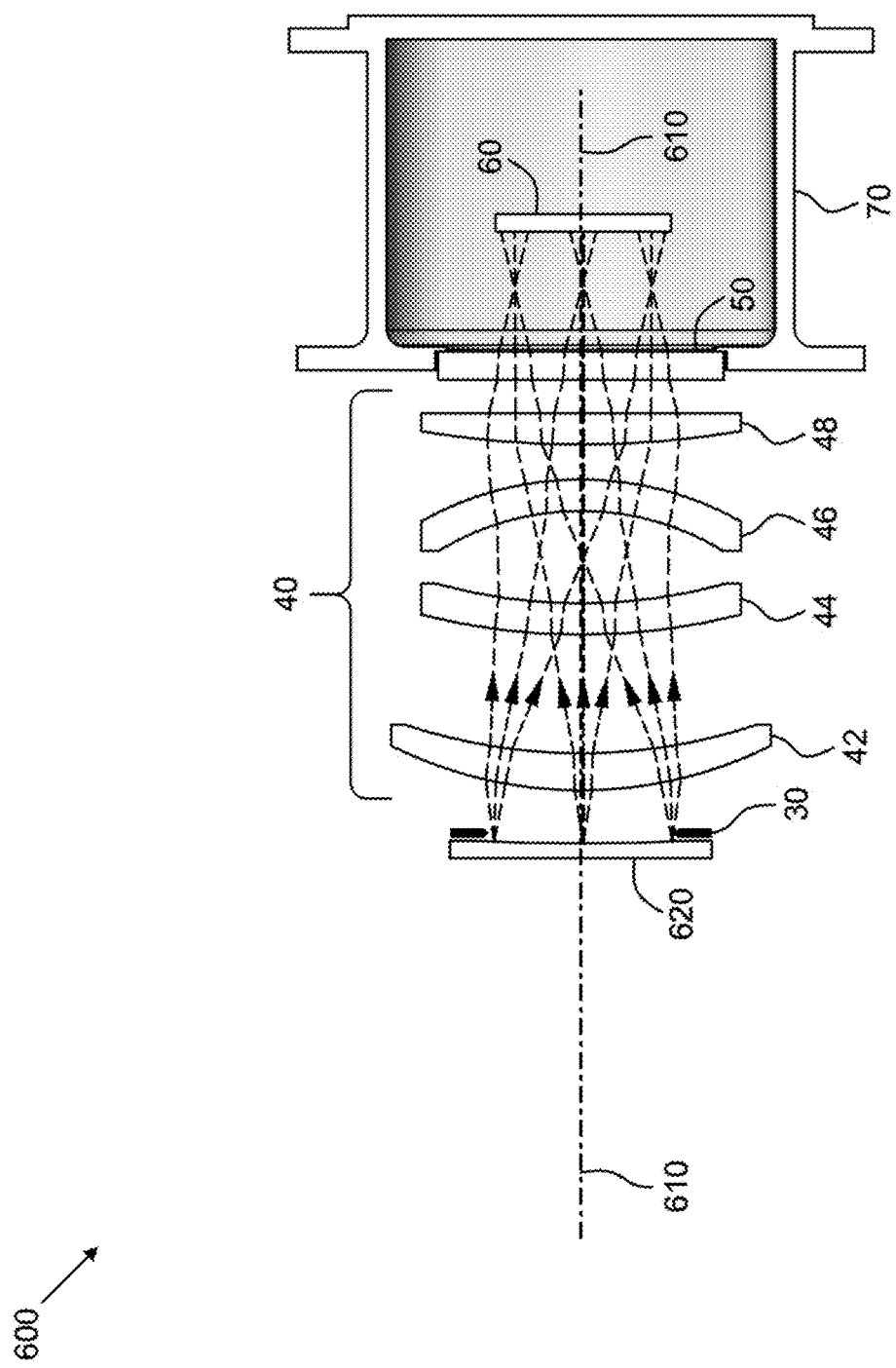

Reference is made to FIG. 6B, which is a schematic view of the present invention 600 illustrated in FIG. 6A taken along the plane containing its optical axis 610. In continuance of its operation, light reflected by the reflecting element 620 is incident onto the imaging optical system 40, which is capable of substantially receiving a portion of the light reflected from the reflecting element 620. The light is then incident upon the optical window 50, which is capable of substantially receiving a portion of the light from the imaging optical system 40. The light is then incident upon the detecting element 60, which is capable of substantially receiving a portion of the light transmitted by the optical window 50. In this embodiment, the optical power of the reflecting element 620 is sufficient such the image of cold objects located within the Dewar 70 is substantially defocused onto the detecting element 60.

Figure 7A:
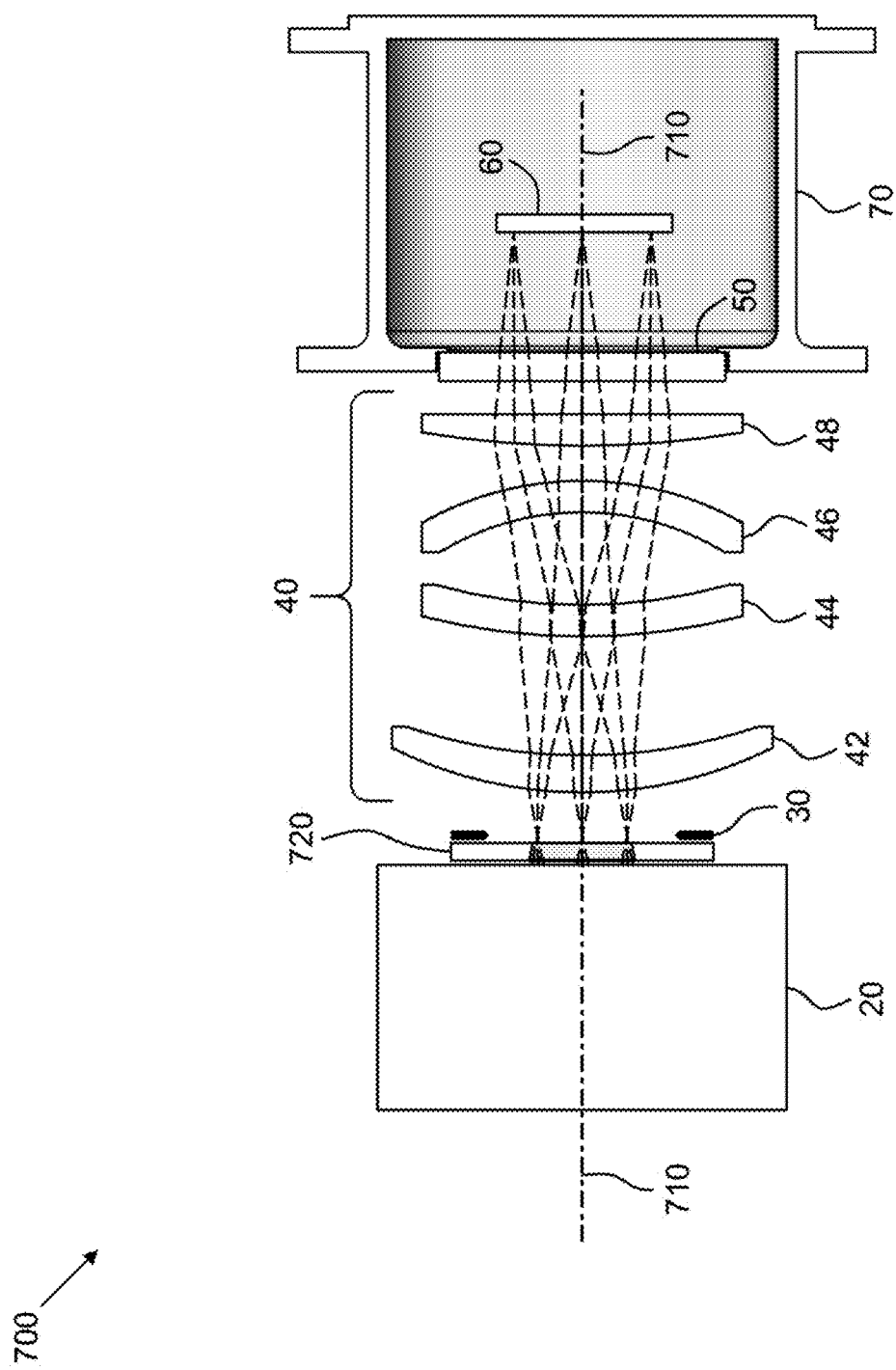
FIG. 7A-7C are schematic views of a further embodiments of the present invention, taken along the plane containing its optical axis.

Reference is made to FIG. 7A, which is a schematic view of another embodiment of the present invention 700 taken along the plane containing its optical axis 710. In operation, light emitted by the source 20, is incident onto a first portion of an aperture 720, which in this embodiment is optically disposed to be substantially proximate to, but not limited to, an entrance pupil 30 of an imaging optical system 40, and is capable of substantially receiving a portion of the light from the source 20 and substantially transmitting the portion of light. The light is then incident onto an imaging optical system 40, in this embodiment made up of, but not limited to, four refractive elements 42, 44, 46, and 48, which is capable of substantially receiving a portion of the light from the aperture 720. The light is then incident upon an optical window 50, which is capable of substantially receiving a portion of the light from the imaging optical system 40. The light is then substantially focused onto a detecting element 60, which is located within the Dewar 70 and capable of substantially receiving a portion of the light transmitted by the optical window 50.

Figure 7B:
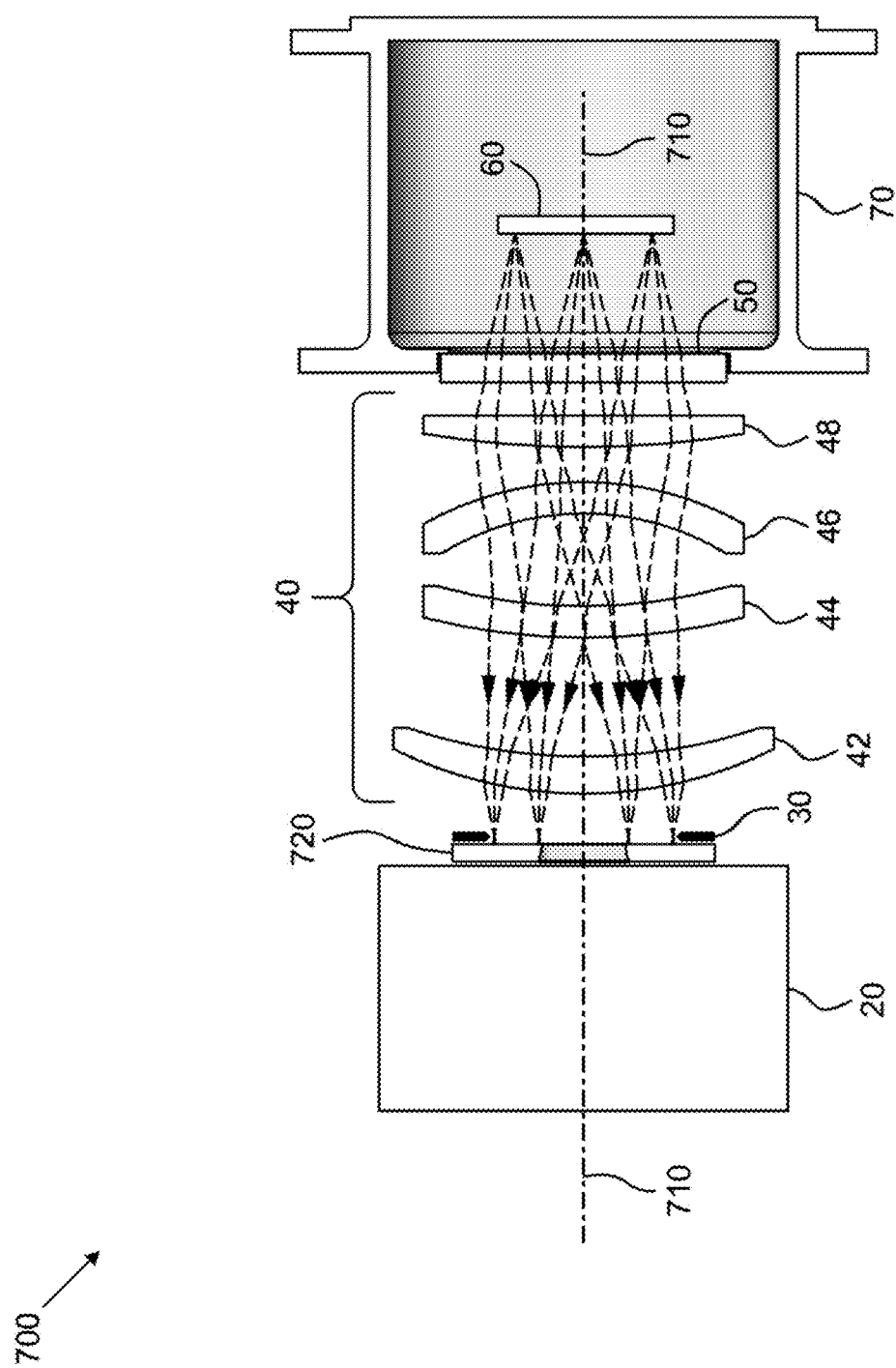

Reference is made to FIG. 7B, which is a schematic view of the embodiment of the present invention 700 illustrated in FIG. 7A taken along the plane containing its optical axis 710. In continuance of its operation, light emitted by cold objects located within the Dewar 70, including but not limited to the detecting element 60 itself, is incident onto the optical window 50, which is capable of substantially receiving a portion of the light from the cold objects located within the Dewar 70. The light is then incident onto the imaging optical system 40, which is capable of substantially receiving a portion of the light from the optical window 50. The light is then incident upon a second portion of the aperture 720, which is capable of substantially receiving a portion of the light from the imaging optical system 40 and substantially reflecting the portion of the light.

Figure 7C:
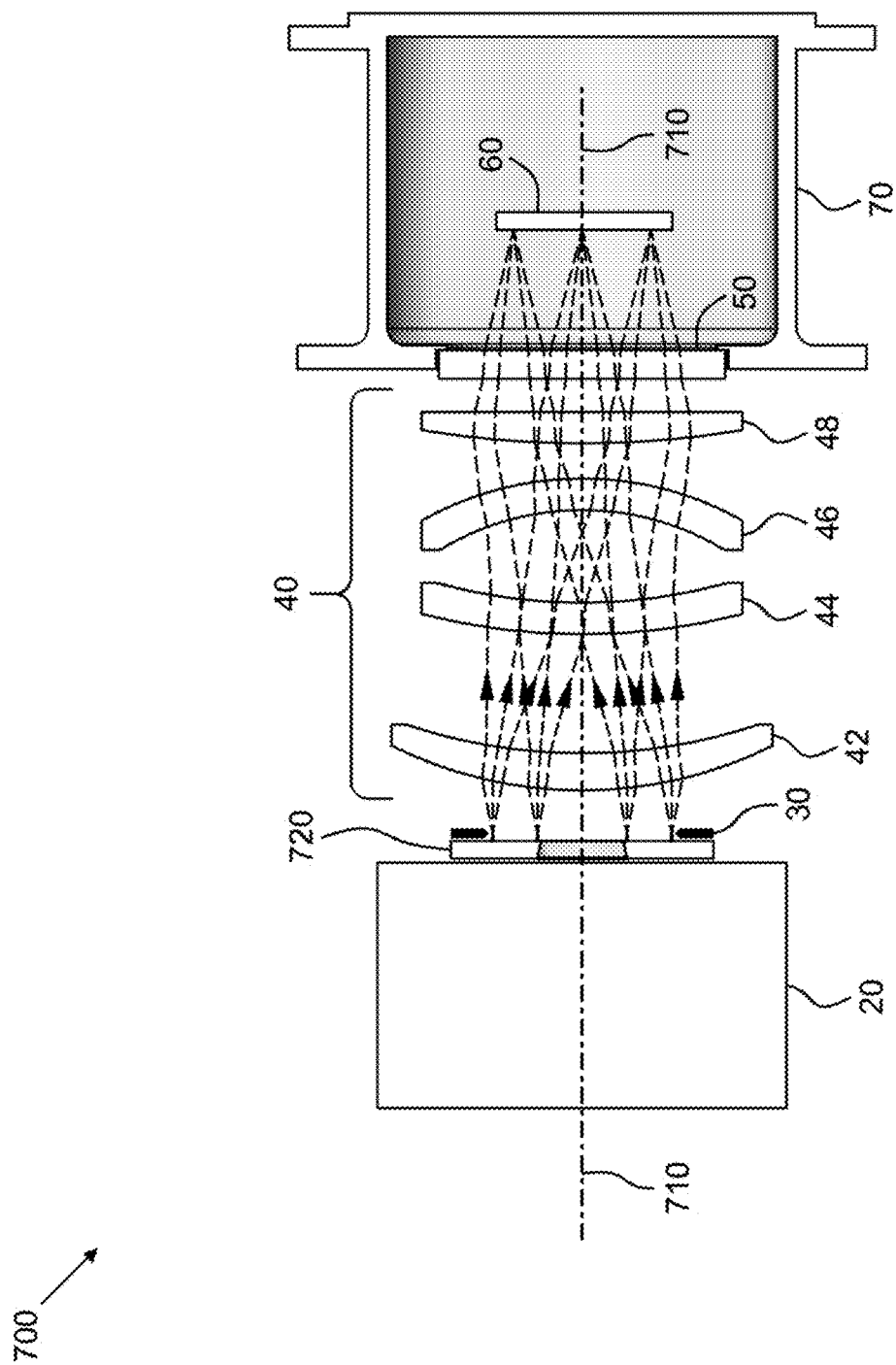

Reference is made to FIG. 7C, which is a schematic view of the present invention 700 illustrated in FIGS. 7A and 7B taken along the plane containing its optical axis 710. In further continuance of its operation, light reflected by the second portion of the aperture 720 is incident onto the imaging optical system 40, which is capable of substantially receiving a portion of the light reflected from the reflecting surface of the aperture 720. The light is then incident upon the optical window 50, which is capable of substantially receiving a portion of the light from the imaging optical system 40. The light is then substantially focused onto the detecting element 60, which is capable of substantially receiving a portion of the light transmitted by the optical window 50. The detecting element 60 substantially receives a combination of portions of light from the source 20 and from the cold objects located within the Dewar 70.

Figure 8A:
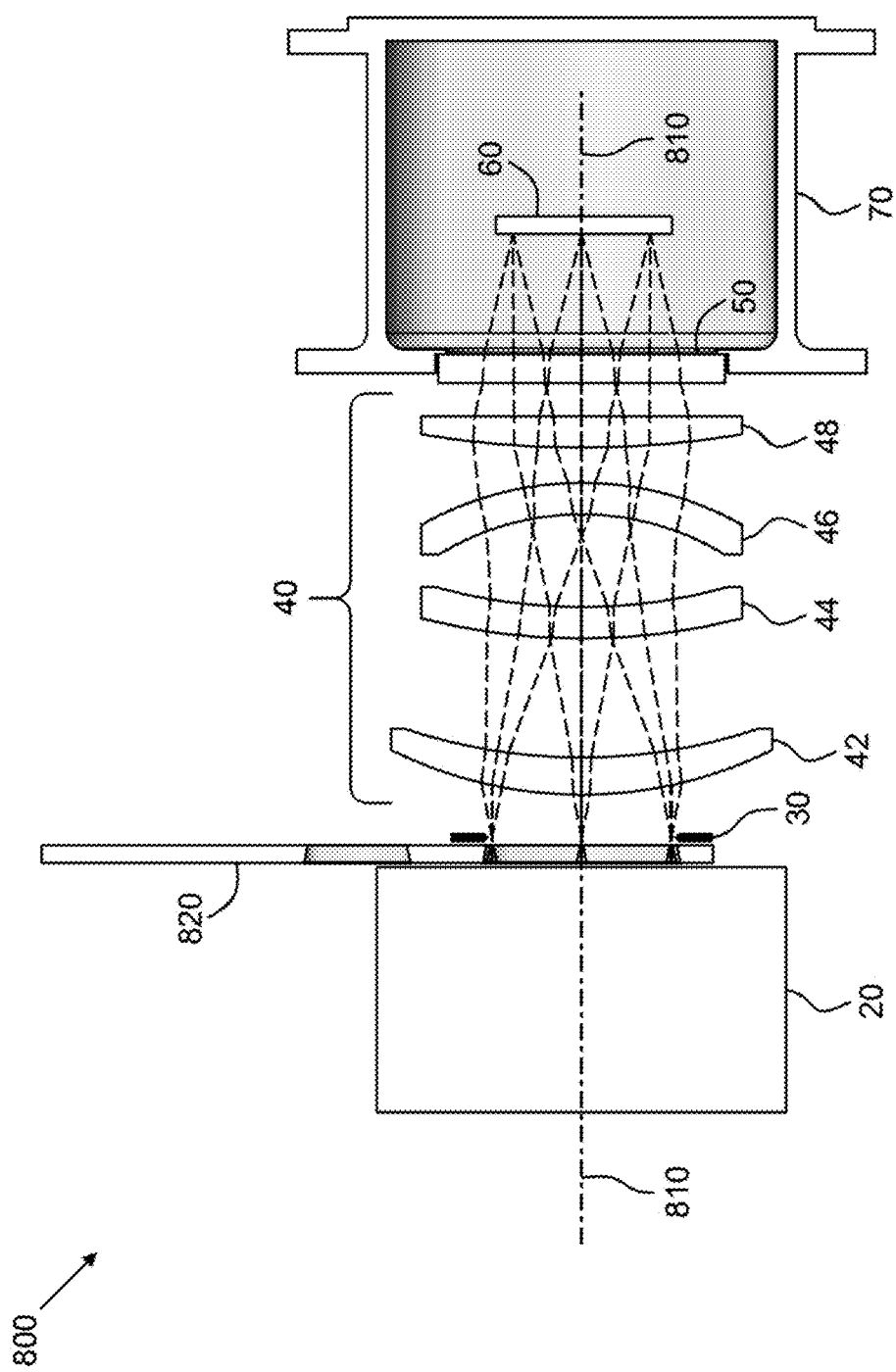
FIGS. 8A, 8B, and 8C are schematic views of a further embodiment of the present invention, taken along the plane containing its optical axis.

Reference is made to FIG. 8A, which is a schematic view of a first configuration of another embodiment of the present invention 800 taken along the plane containing its optical axis 810. In operation, light emitted by the source 20, is incident onto a first portion of an aperture 820, which in this embodiment is optically disposed to be substantially proximate to, but not limited to, an entrance pupil 30 of an imaging optical system 40, and is capable of substantially receiving a portion of the light from the source 20 and substantially transmitting the portion of light. The light is then incident onto an imaging optical system 40, in this embodiment made up of, but not limited to, four refractive elements 42, 44, 46, and 48, which is capable of substantially receiving a portion of the light from the aperture 720. The light is then incident upon an optical window 50, which is capable of substantially receiving a portion of the light from the imaging optical system 40. The light is then substantially focused onto a detecting element 60, which is located within the Dewar 70 and capable of substantially receiving a portion of the light transmitted by the optical window 50.

Figure 8B:
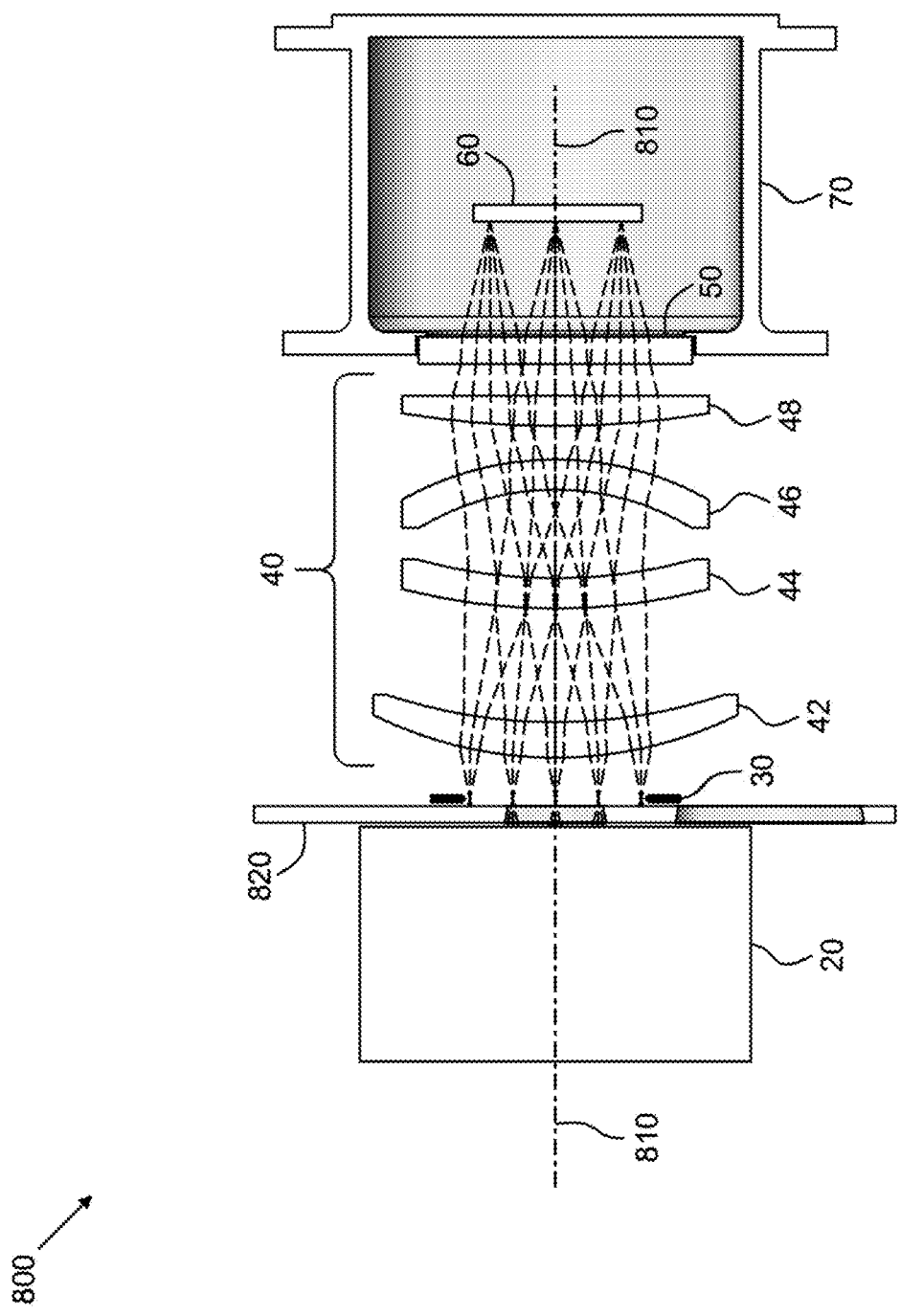

Reference is made to FIG. 8B, which is a schematic view of a second configuration of the embodiment of the present invention 800 illustrated in FIG. 8A taken along the plane containing its optical axis 810. In this configuration, its operation is substantially the same as the embodiment of the present invention 700 illustrated in FIGS. 7A, 7B, and 7C, where a second portion of the aperture 820 in the embodiment 800 is substantially the same as the aperture 720 in the embodiment 700.

Figure 8C:
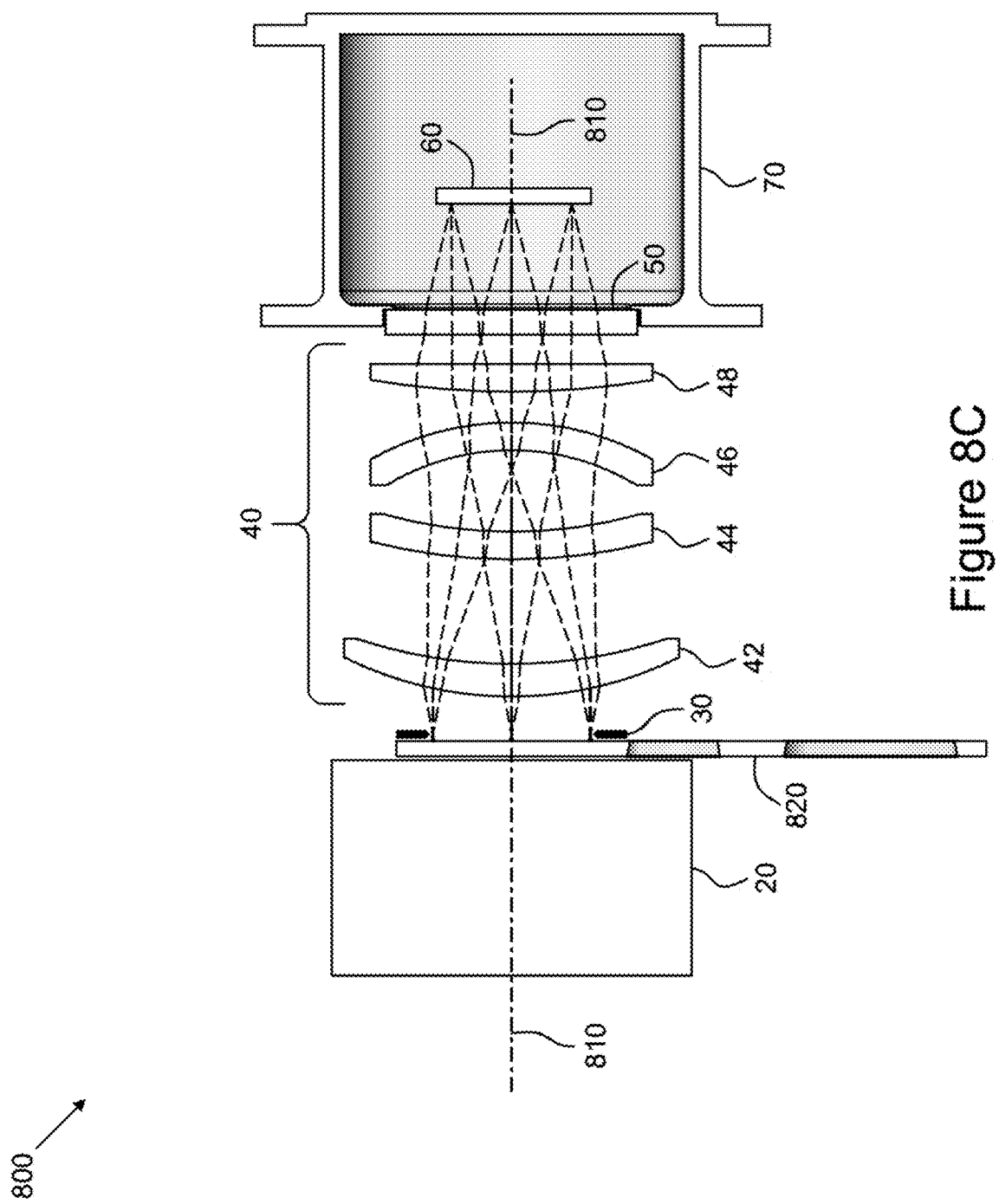

Reference is made to FIG. 8C, which is a schematic view of a third configuration of another embodiment of the present invention 800 taken along the plane containing its optical axis 810. In this configuration, its operation is substantially the same as the embodiment of the present invention 500 illustrated in FIGS. 5A and 5B, where a first portion of the aperture 820 in the embodiment 800 is substantially the same as the reflecting element 520 in the embodiment 500.

Figure 8D:
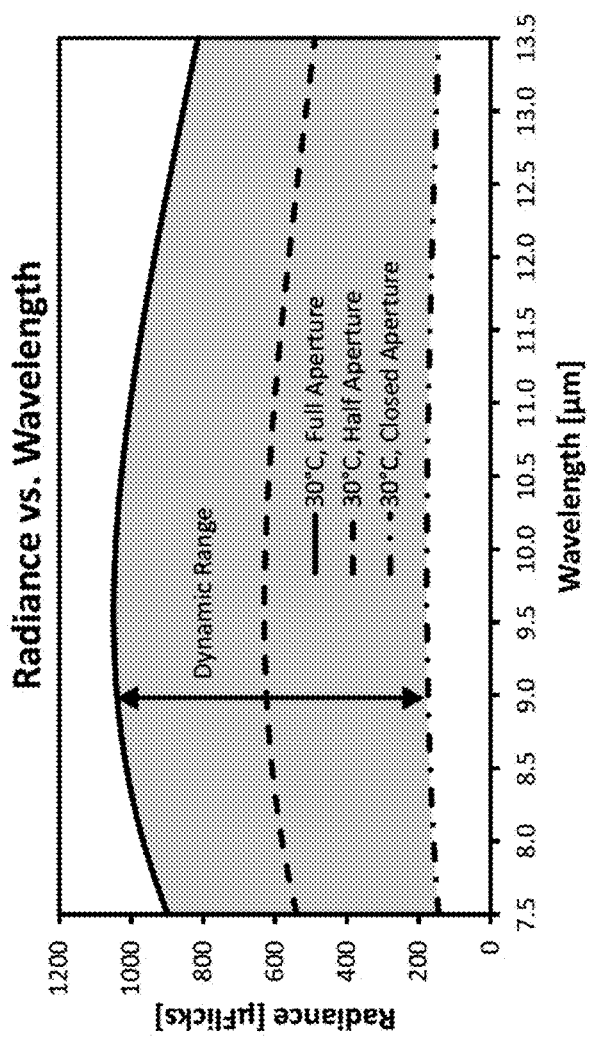
FIG. 8D illustrates the dynamic range and sampling in radiance for the embodiment of the present invention of FIGS. 8A, 8B, and 8C.

Reference is made to FIG. 8D which illustrates for the case the embodiment of the present invention 800 illustrated in FIGS. 8A, 8B, and 8C the radiance seen by the detecting element 60 for the source 20 operating at a temperature of 30° C. with the aperture 820 operating in each of its configurations. From this illustration, it can be seen that the range of radiances for performing non-uniformity correction or radiometric calibration of the sensor is not only increased, but that multiple correction points spaced within that dynamic range can be generated.

Figure 9:
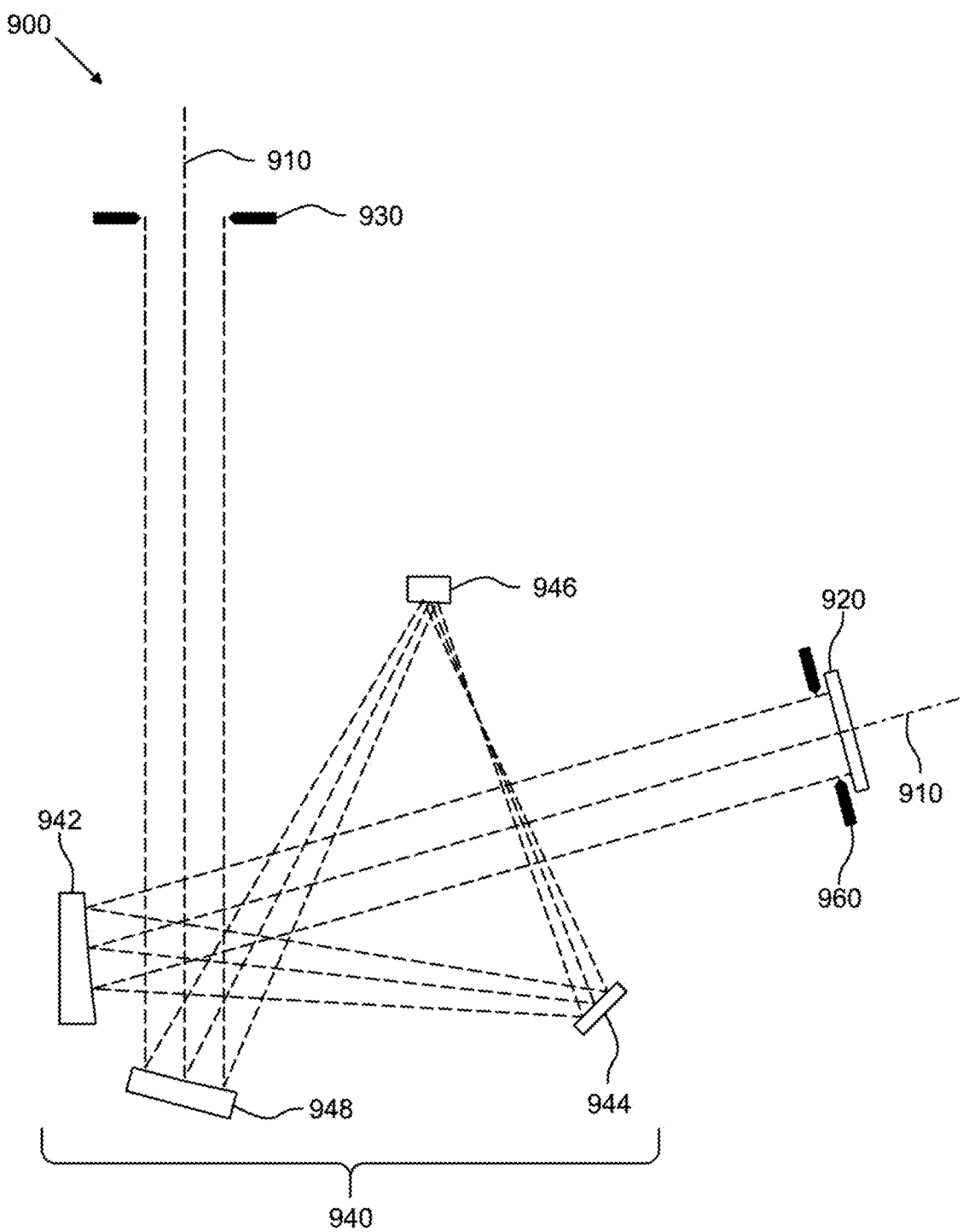
FIG. 9 is a schematic view of an optical pupil relay system taken along the plane containing its optical axis.

Reference is made to FIG. 9 which is a schematic view of an optical pupil relay system 900 taken along the plane containing its optical axis 910. In operation, light emitted by a source 920, which in this embodiment is optically disposed to be substantially proximate to, but not limited to, an entrance pupil 960 of an imaging optical system 940, is incident onto the imaging optical system 940, in this embodiment made up of, but not limited to, four reflective elements 942, 944, 946, and 948, which is capable of substantially receiving a portion of the light from the source 920 and substantially imaging the entrance pupil 960 onto an exit pupil 930.

Figure 10:
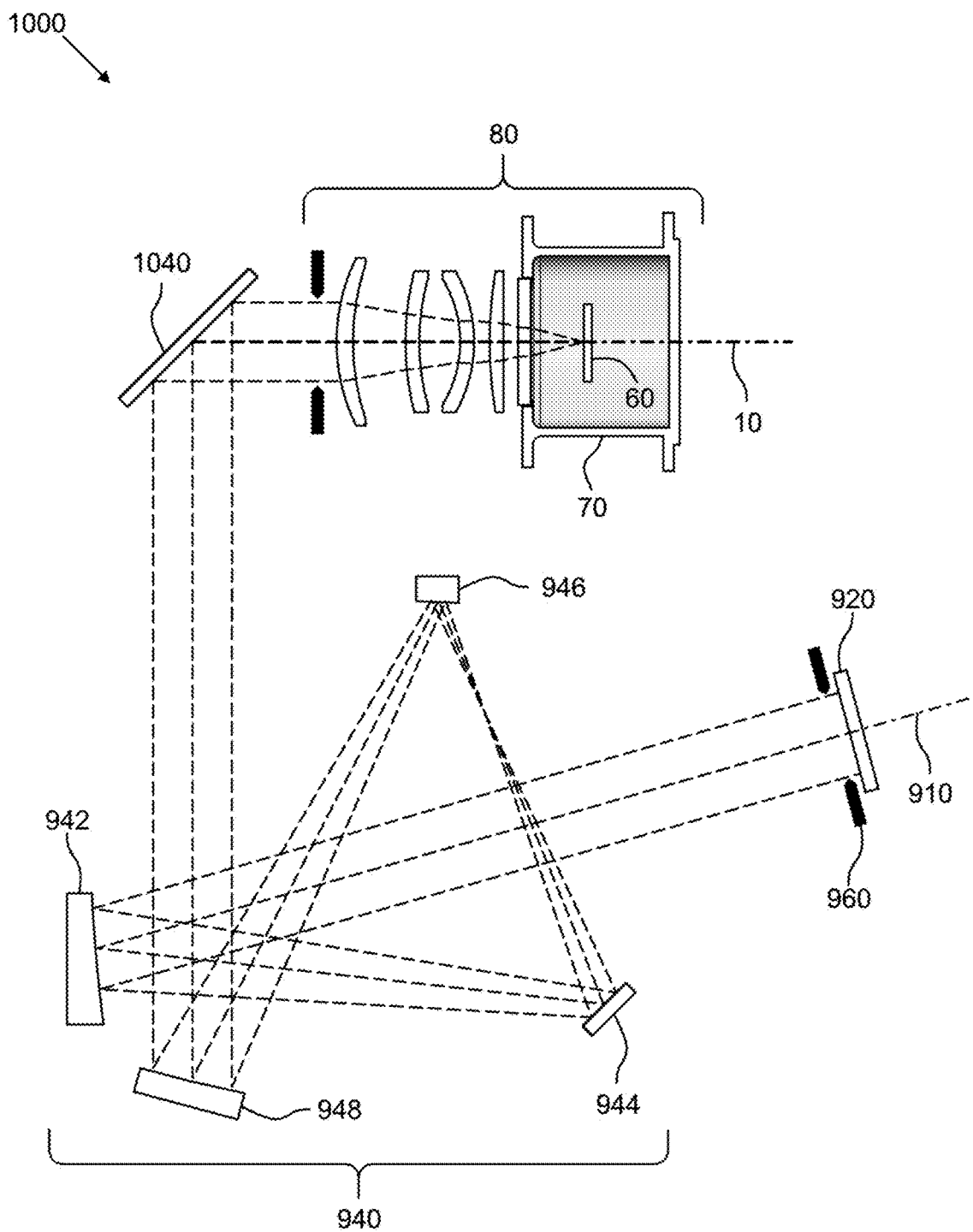
FIG. 10 is a schematic view of a further embodiment of the present invention, taken along the plane containing its optical axes.

Reference is made to FIG. 10, which is a schematic view of an optical imaging system 1000 taken along the plane containing its optical axes 10 and 910. In operation, light emitted by a source 920, which in this embodiment is optically disposed to be substantially proximate to, but not limited to, an entrance pupil 960 of an imaging optical system 940, is incident onto the imaging optical system 940, in this embodiment made up of, but not limited to, four reflective elements 942, 944, 946, and 948, which is capable of substantially receiving a portion of the light from the source 920. The light is then incident upon a fold mirror 1040, which is capable of substantially receiving a portion of the light from the imaging optical system 940 and reflecting a portion of the light. The light is then incident upon an imaging optical system 80, which is capable of substantially receiving a portion of the light from the fold mirror 1040 and substantially focusing the light onto a detecting element 60, which is located within the Dewar 70.

Figure 11A:
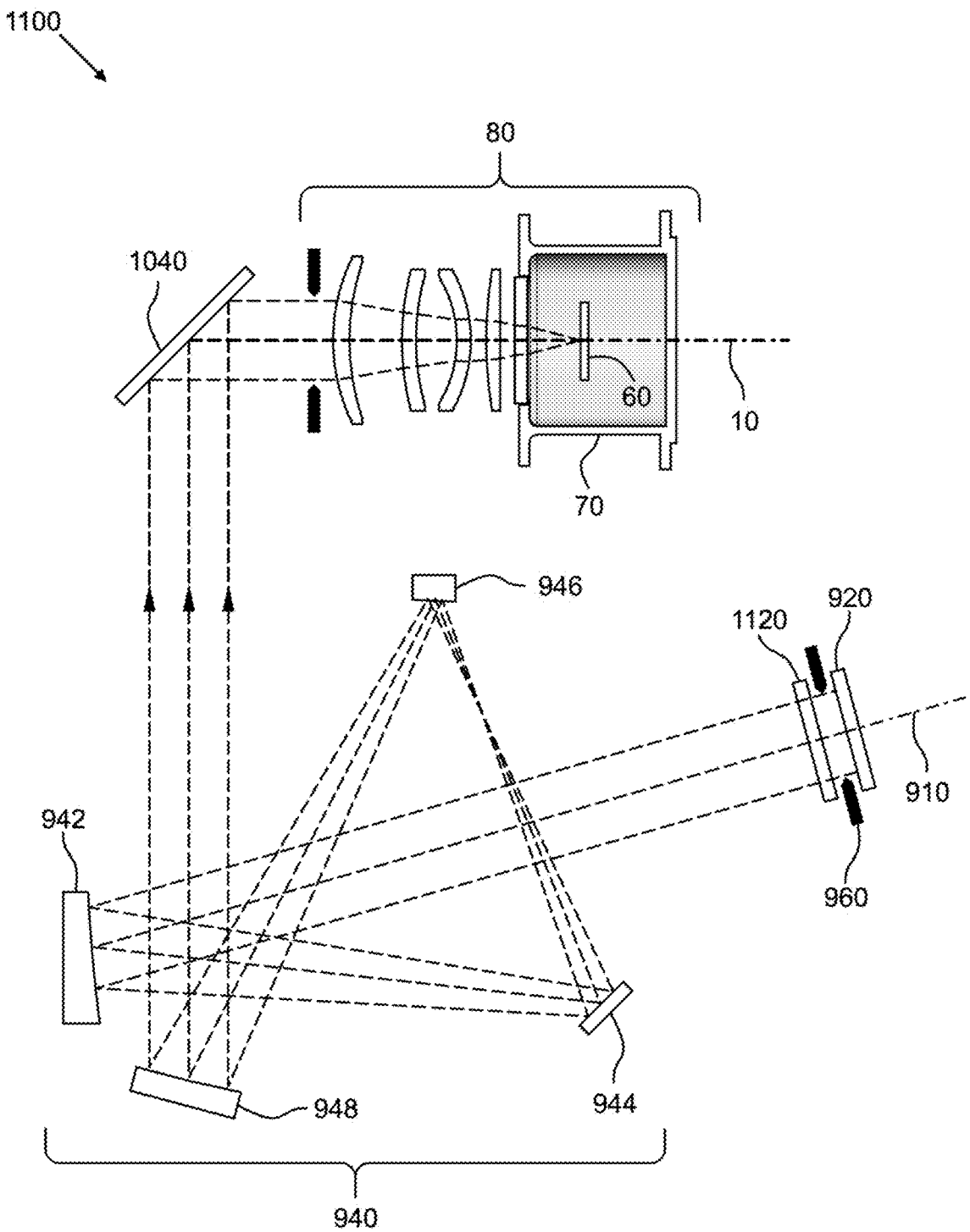
FIGS. 11A, 11B, 11C and 11D are schematic views of a further embodiment of the present invention, taken along the plane containing its optical axes.

Reference is made to FIG. 11A, which is a schematic view of a first configuration of another embodiment of the present invention 1100 taken along the plane containing its optical axes 10 and 910. In operation, light emitted by a source 920, which in this embodiment is optically disposed to be substantially proximate to, but not limited to, an entrance pupil 960 of an imaging optical system 940, is incident onto an optical element 1120, which is optically disposed to substantially receive a portion of the light from the source 920. The light is then incident upon an imaging optical system 940, in this embodiment made up of, but not limited to, four reflective elements 942, 944, 946, and 948, which is capable of substantially receiving a portion of the light from the source 920. The light is then incident upon a fold mirror 1040, which is capable of substantially receiving a portion of the light from the imaging optical system 940 and reflecting a portion of the light. The light is then incident upon an imaging optical system 80, which is capable of substantially receiving a portion of the light from the fold mirror 1040 and substantially focusing the light onto a detecting element 60, which is located within the Dewar 70.

Figure 11B:
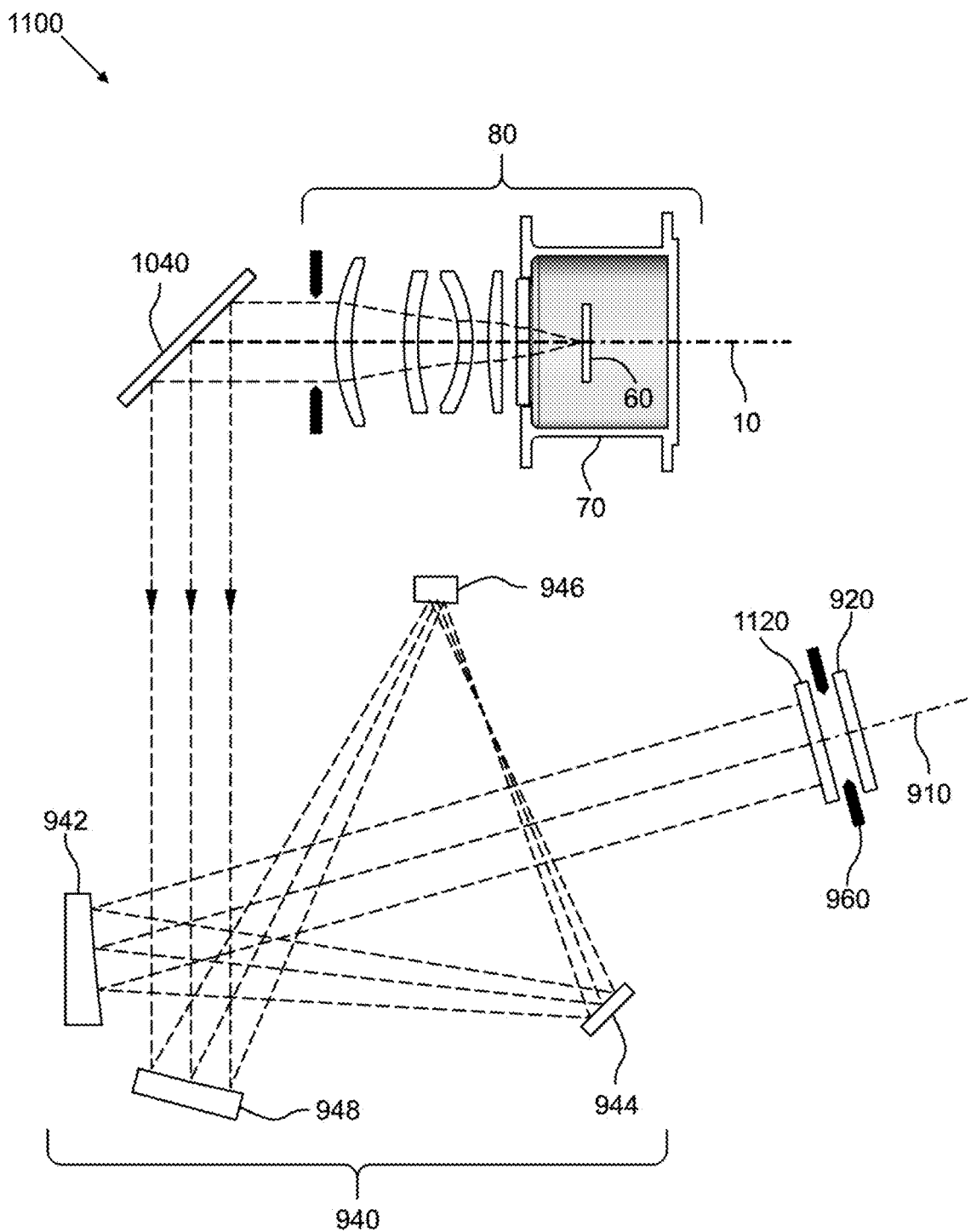

Reference is made to FIG. 11B, which is a schematic view of a second configuration of the embodiment of the present invention 1100 illustrated in FIG. 11A taken along the plane containing its optical axes 10 and 910. In operation, light emitted by cold objects located within the Dewar 70, including but not limited to the detecting element 60 itself, is substantially transmitted by the imaging optical system 80 onto the fold mirror 840, which is capable of substantially receiving a portion of the light from the imaging optical system 80 and the cold objects located within the Dewar 70. The light is then incident onto the imaging optical system 940, which is capable of substantially receiving a portion of the light from the fold mirror 1040. The light is then incident upon the optical element 1120, which in this embodiment can be switched, closed, re-oriented, electrically converted, or otherwise modified to be substantially reflective and is capable of substantially receiving a portion of the light from the imaging optical system 940 and substantially reflecting the light.

Figure 11C:
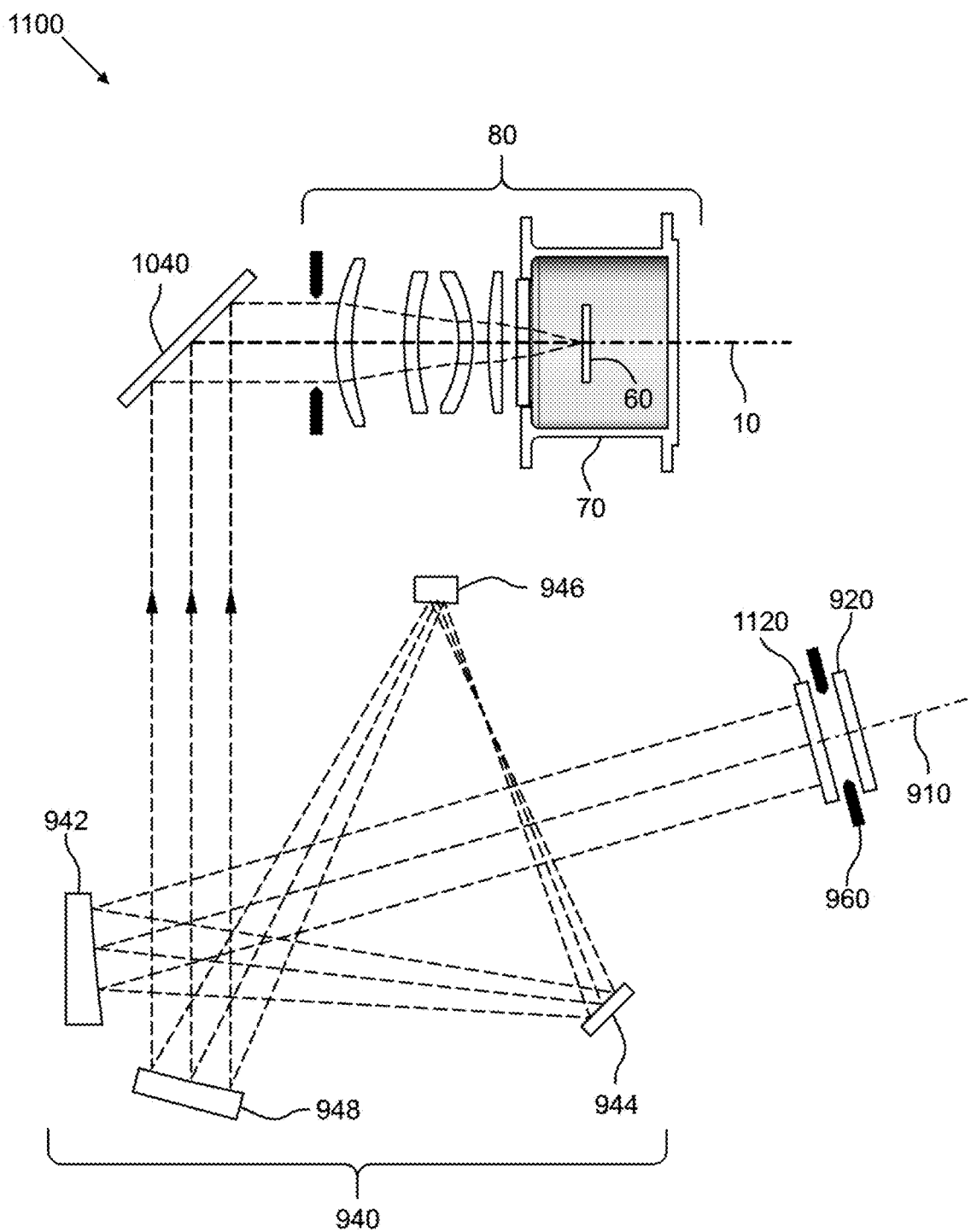

Reference is made to FIG. 11C, which is a schematic view of the second configuration of the embodiment of the present invention 1100 illustrated in FIGS. 11A and 11B taken along the plane containing its optical axes 10 and 910. In continuance of its operation, light reflected by the optical element 1120 is incident upon the imaging optical system 940, which is capable of substantially receiving a portion of the light from the optical element 1120. The light is then incident upon the fold mirror 1040, which is capable of substantially receiving a portion of the light from the imaging optical system 940 and reflecting a portion of the light. The light is then incident upon the imaging optical system 80, which is capable of substantially receiving a portion of the light from the fold mirror 1040 and substantially focusing the light onto the detecting element 60, which is located within the Dewar 70.

Figure 11D:
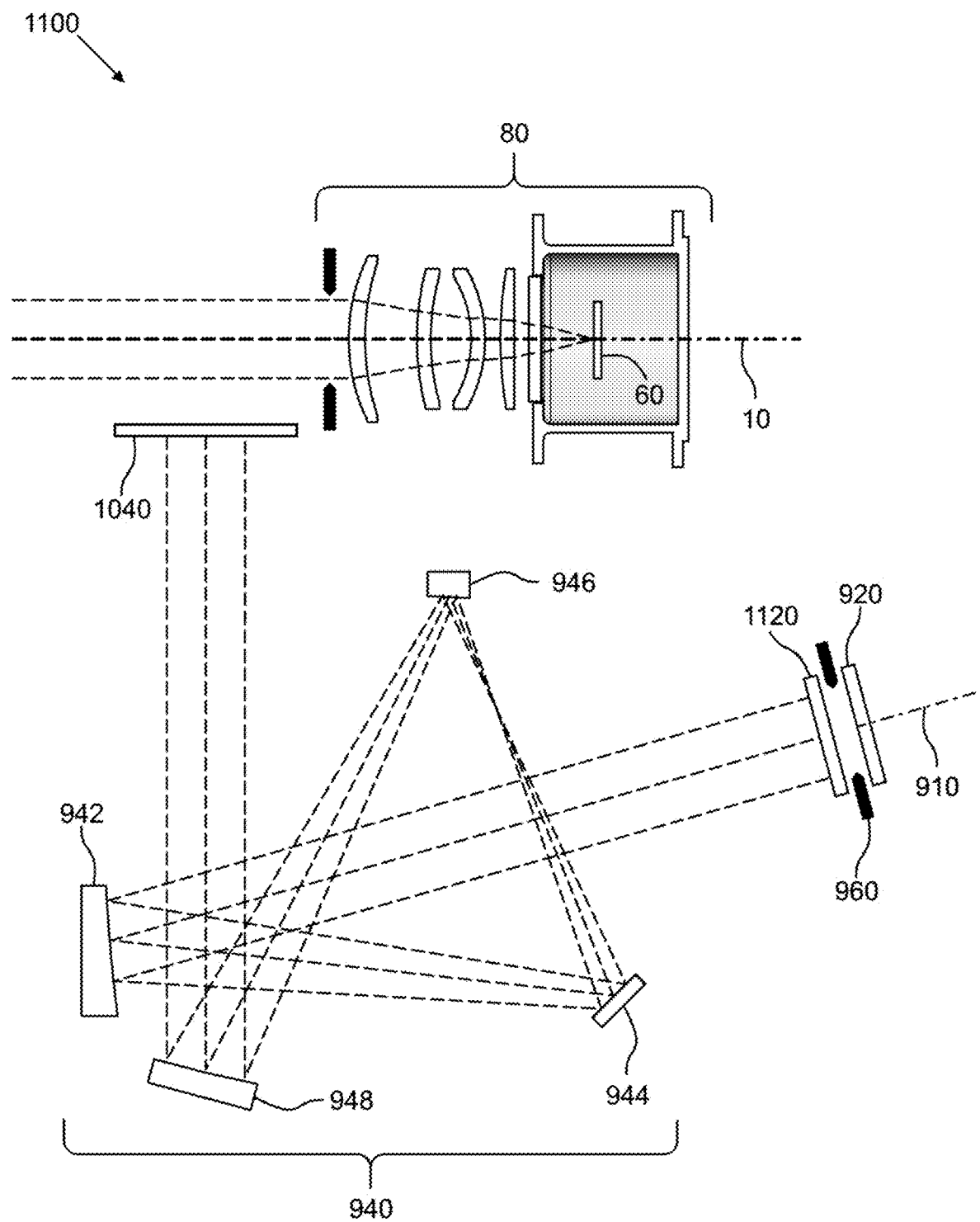

Reference is made to FIG. 11D, which is a schematic view of a third configuration of the embodiment of the present invention illustrated in FIGS. 11A, 11B, and 11C taken along the plane containing its optical axes 10 and 910. In this configuration, the fold mirror 1040 can be moved, re-oriented, electrically displaced, or otherwise repositioned such that light from an external source (not shown) is incident upon the imaging optical system 80, which is capable of substantially receiving a portion of the light from the external source and substantially focusing the light onto the detecting element 60, which is located within the Dewar 70. Through these configurations, this embodiment of the present invention is capable of imaging external sources while also being capable of imaging internal sources as well as cold objects located within the Dewar to provide non-uniformity correction with an increased dynamic range.

Figure 12A:
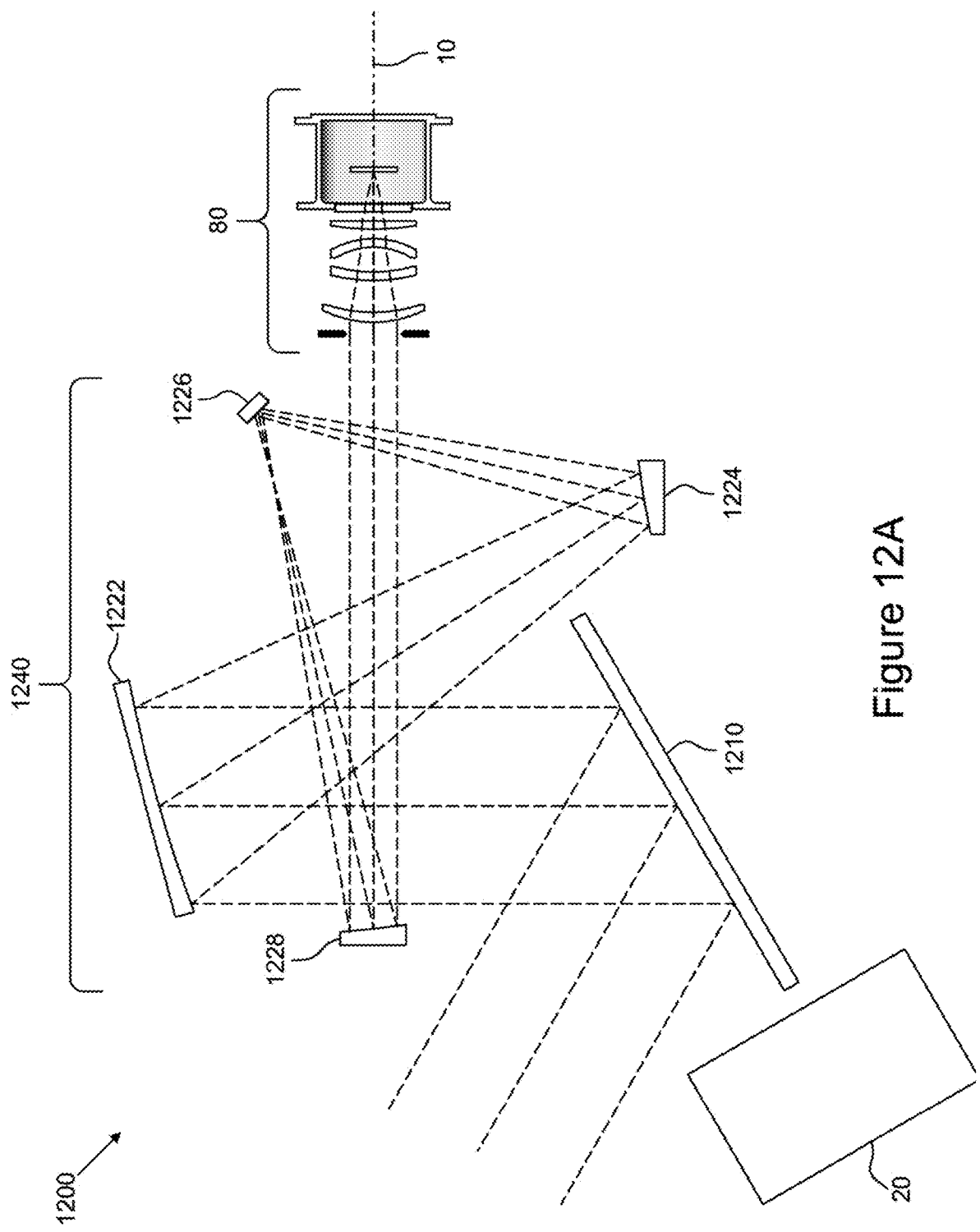
FIGS. 12A, 12B, 12C and 12D are schematic views of a still further embodiment of the present invention, taken along its optical axis.

Reference is made to FIG. 12A, which is a schematic view of a first configuration of another embodiment of the present invention 1200 taken along the plane containing its optical axis 10. In operation, light emitted by an external source (not shown) is incident onto a scanning mirror 1210, which is optically disposed to substantially receive a portion of the light from the external source. The light is then incident upon an imaging optical system 1240, in this embodiment made up of, but not limited to, four reflective elements 1242, 1244, 1246, and 1248, which is capable of substantially receiving a portion of the light from the scanning mirror 1210. The light is then incident upon an imaging optical system 80, which is capable of substantially receiving a portion of the light from the imaging optical system 1240 and substantially focusing the light onto a detecting element 60, which is located within the Dewar 70.

Figure 12B:
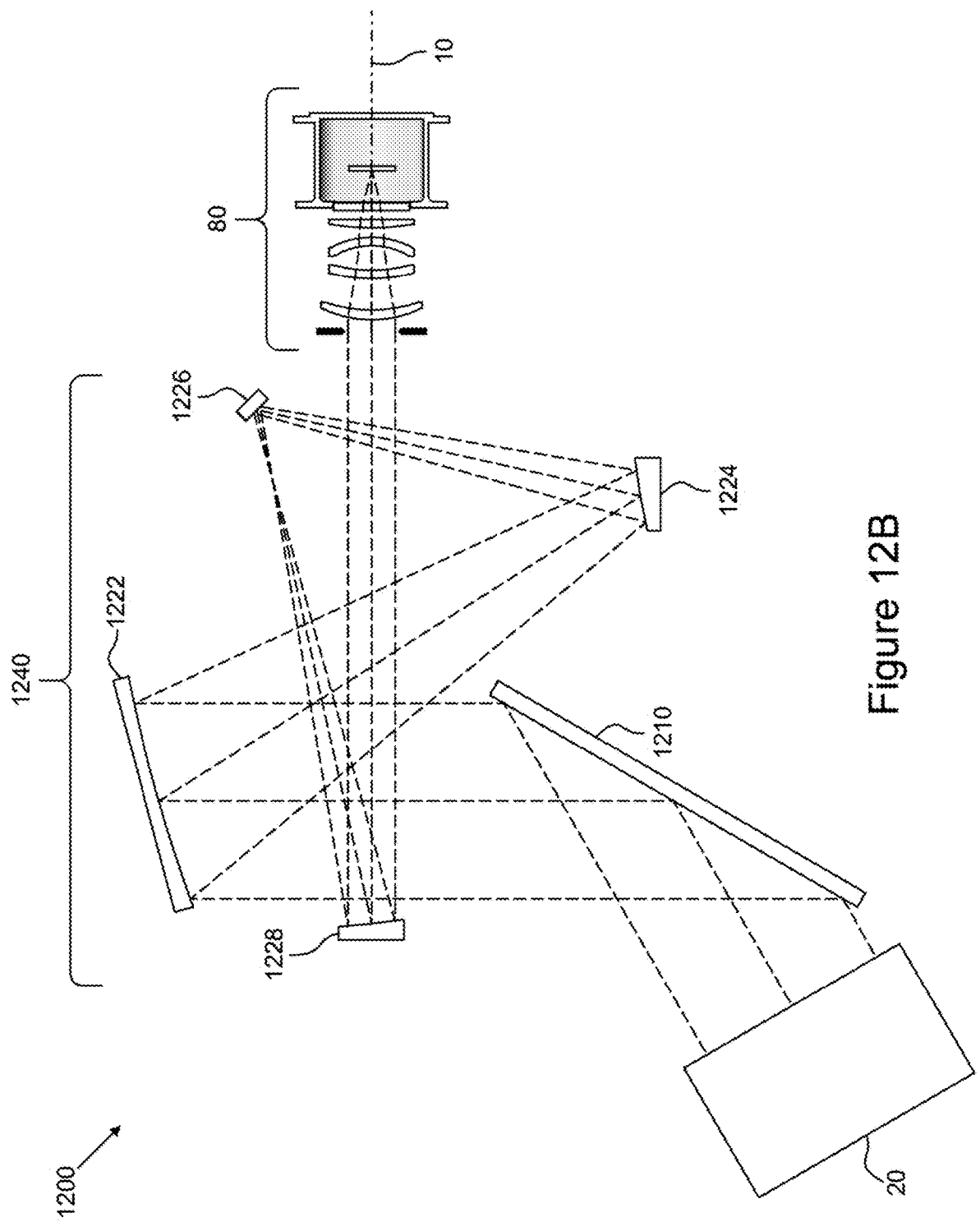

Reference is made to FIG. 12B, which is a schematic view of a second configuration of the embodiment of the present invention 1200 illustrated in FIG. 12A taken along the plane containing its optical axis 10. In this embodiment, the scanning mirror 1210 can be moved, re-oriented, electrically displaced, or otherwise repositioned such that light emitted by a second source 20 is incident onto the scanning mirror 1210, which is capable of substantially receiving a portion of the light from the source 20. The light is then incident upon the imaging optical system 1240, which is capable of substantially receiving a portion of the light from the scanning mirror 1210. The light is then incident upon the imaging optical system 80, which is capable of substantially receiving a portion of the light from the imaging optical system 1240 and substantially focusing the light onto the detecting element 60, which is located within the Dewar 70.

Figure 12C:
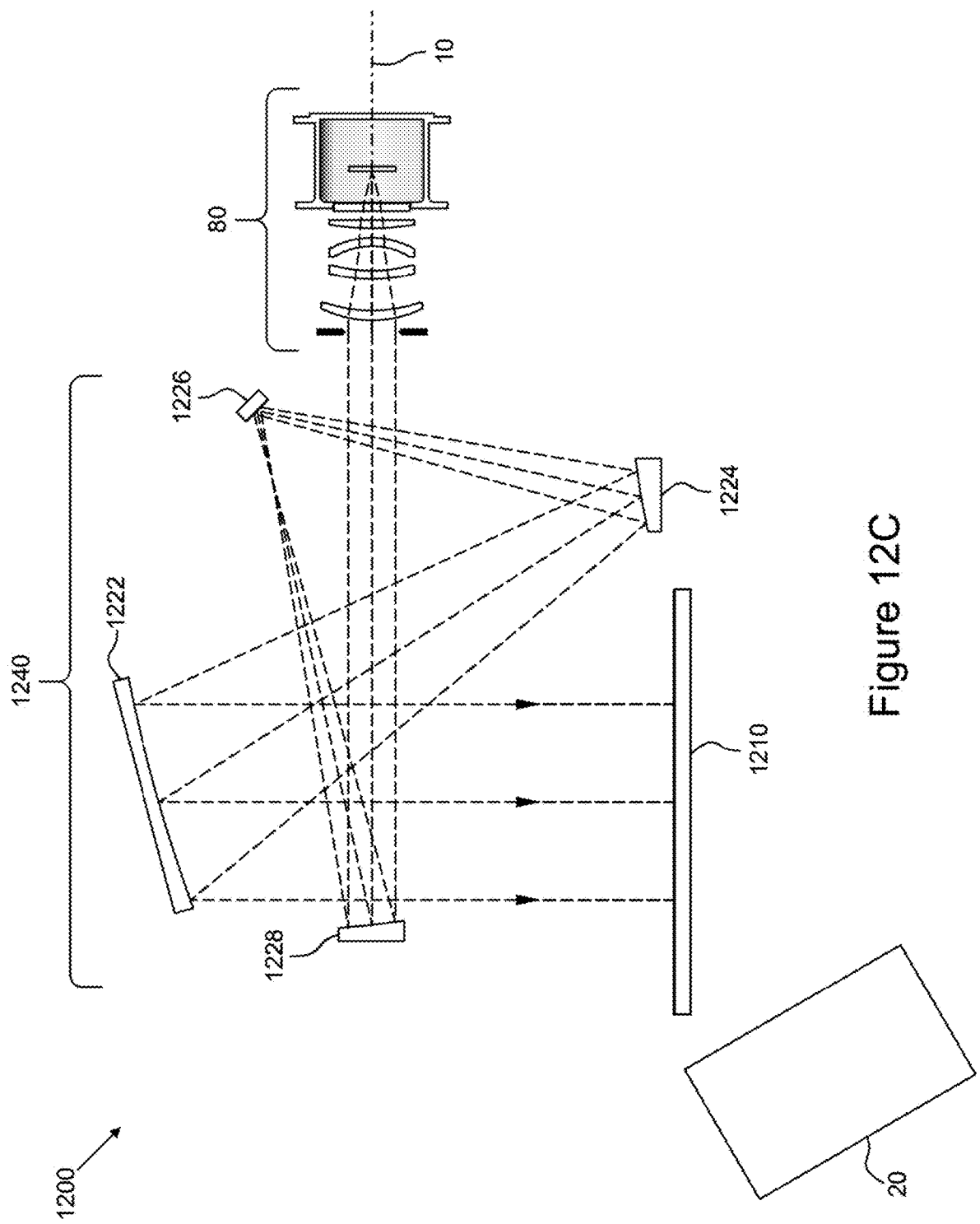

Reference is made to FIG. 12C, which is a schematic view of a third configuration of the embodiment of the present invention 1200 illustrated in FIGS. 12A and 12B taken along the plane containing its optical axis 10. In operation, light emitted by cold objects located within the Dewar 70, including but not limited to the detecting element 60 itself, is substantially transmitted by the imaging optical system 80 onto the imaging optical system 940, which is capable of substantially receiving a portion of the light from the imaging optical system 80. The light is then incident upon the scanning mirror 1210, which is capable of substantially receiving a portion of the light from the imaging optical system 1240 and in this embodiment can be can be moved, re-oriented, electrically displaced, or otherwise repositioned to reflect the light back towards imaging optical system 1240.

Figure 12D:
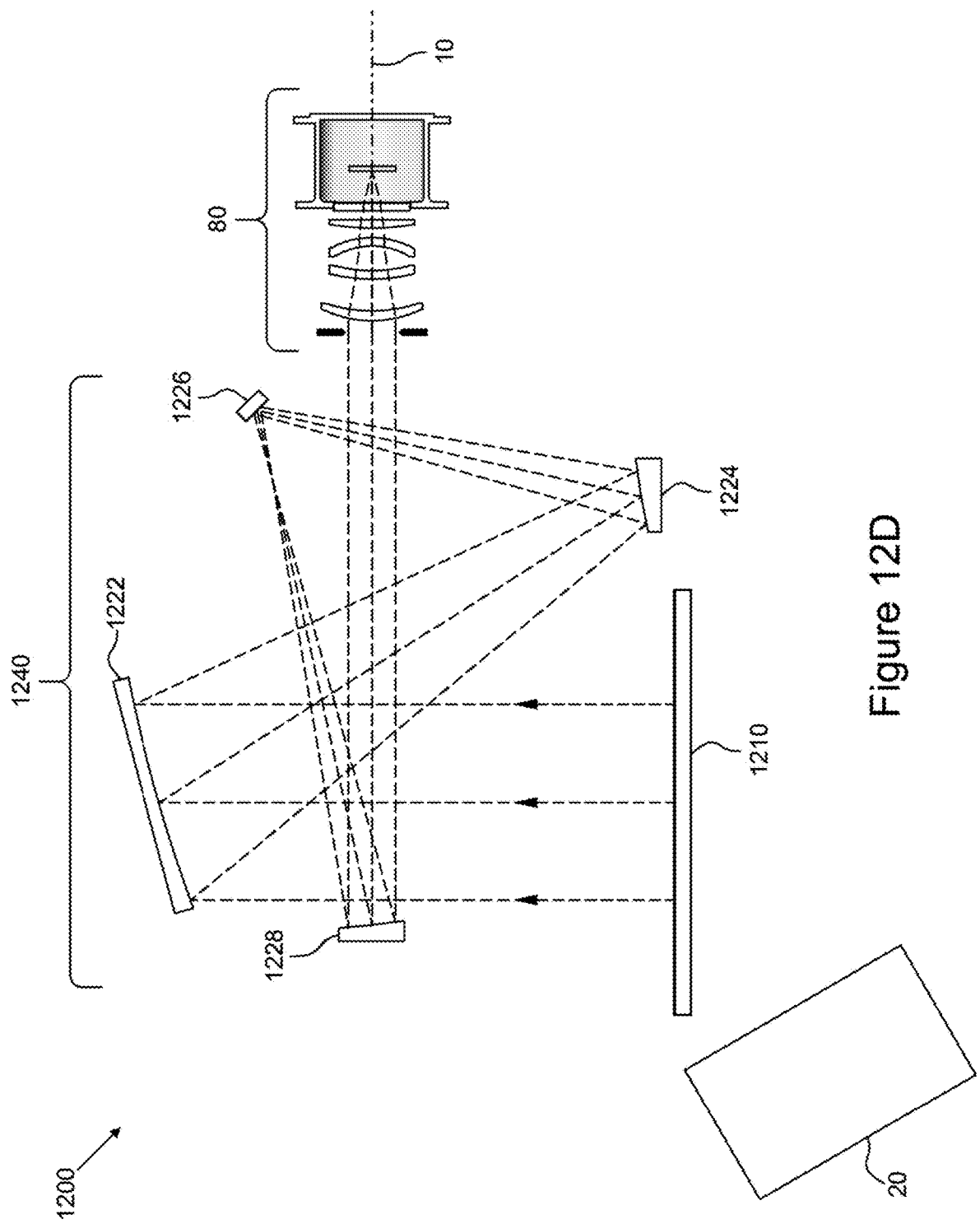

Reference is made to FIG. 12D, which is a schematic view of the third configuration of the embodiment of the present invention 1200 illustrated in FIGS. 12A, 12B, and 12C taken along the plane containing its optical axis 10. In continuance of its operation, light reflected by the scanning mirror 1210 is incident upon the imaging optical system 1240, which is capable of substantially receiving a portion of the light from the scanning mirror 1210. The light is then incident upon the imaging optical system 80, which is capable of substantially receiving a portion of the light from the imaging optical system 1240 and substantially focusing the light onto the detecting element 60, which is located within the Dewar 70. Through these configurations, this embodiment of the present invention is capable of imaging external sources while also being capable of imaging internal sources as well as cold objects located within the Dewar to provide non-uniformity correction with an increased dynamic range.

Although the invention has been described with respect to various embodiments, it should be realized this invention is also capable of a wide variety of further and other embodiments within the spirit and scope of the invention. For example, any number of optical elements, reflective or refractive, can be used in the embodiments of the present invention, and any aspects of the embodiments of the present invention, including but not limited to those shown, can be used in combination with one another as still further embodiments, such that each portion of the object can be imaged by any method such as but not limited to those shown in the embodiments of the present invention. Still further, although the embodiments of the optical systems of the present invention have been shown a limited number of configurations, it should be realized that this invention can include any number of configurations.

What is claimed is:

1. An optical imaging system comprising:
    a detector;
    an environmental device capable of providing an operating environment suitable for said detector; said environmental device being configured to receive a portion of electromagnetic radiation from said detector; an optical subassembly having at least one optical element;
    said optical subassembly being configured to receive a portion of the electromagnetic radiation from said environmental device;
    a source of electromagnetic radiation;
    a configurable element;
    said configurable element being optically disposed between said source and said optical subassembly; said configurable element being configurable such that, in a first configuration, said configurable element is configured to reflect a portion of the electromagnetic radiation from said optical subassembly, and, in a second configuration, said configurable element is configured to transmit a portion of the electromagnetic radiation from said source;
    said optical subassembly being configured to receive a portion of the electromagnetic radiation reflected by said configurable element in said first configuration;
    said optical subassembly being configured to receive a portion of the electromagnetic radiation transmitted by said configurable element in said second configuration;
    said environmental device being configured to receive a portion of the electromagnetic radiation from said optical subassembly; and
    said detector being configured to receive a portion of the electromagnetic radiation transmitted by said environmental device.

2. The optical imaging system of claim 1 wherein said at least one optical element is refractive.

3. The optical imaging system of claim 1 wherein said at least one optical element is reflective.

4. The optical imaging system of claim 1 wherein said configurable element has no optical power.

5. The optical imaging system of claim 1 wherein said configurable element has optical power.

6. The optical imaging system of claim 1, wherein said configurable element is configured to have a plurality of configurations, such that, in a third configuration in said plurality of configurations, said configurable element is partially reflective or partially transmissive to electromagnetic radiation.

7. An optical imaging system comprising:
a detector;
an environmental device configured to provide an operating environment suitable for said detector; said environmental device being configured to receive a portion of electromagnetic radiation from said detector;
an optical subassembly having at least one optical element;
said optical subassembly being configured to receive a portion of the electromagnetic radiation from said environmental device;
a configurable redirecting element; said configurable redirecting element being configured to redirect a portion of the electromagnetic radiation from said optical subassembly back to said optical subassembly when said configurable redirecting element is in a first configuration;
a source of electromagnetic radiation; said configurable redirecting element also being configured to redirect a portion of electromagnetic radiation from said source to said optical subassembly when said configurable redirecting element is in a second configuration; said optical subassembly being configured to receive a portion of the electromagnetic radiation redirected by said configurable redirecting element; said environmental device being configured to receive a portion of the electromagnetic radiation from said optical subassembly; and
said detector being configured to receive a portion of the electromagnetic radiation transmitted by said environmental device.

8. The optical imaging system of claim 7 wherein said at least one optical element is refractive.

9. The optical imaging system of claim 7 wherein said at least one optical element is reflective.

10. The optical imaging system of claim 7 wherein said configurable redirecting element is reflective.

11. The optical imaging system of claim 10 wherein said configurable redirecting element is a scanning mirror.

12. An optical imaging system comprising:
a detector;
an environmental device configured to provide an operating environment suitable for said detector; said environmental device being configured to receive a portion of electromagnetic radiation from said detector;
an optical subassembly having at least one optical element;
said optical subassembly being configured to receive a portion of the electromagnetic radiation from said environmental device;
a configurable redirecting element; said configurable redirecting element being configured to have a plurality of configurations; said configurable redirecting element being configured to redirect a portion of the electromagnetic radiation from said optical subassembly back to said optical subassembly when said configurable redirecting element is in a first configuration;
a plurality of sources of electromagnetic radiation;
said configurable redirecting element also being configured to redirect a portion of electromagnetic radiation from at least one source of electromagnetic radiation in said plurality of sources of electromagnetic radiation to said optical subassembly when said configurable redirecting element is in at least one configuration of said plurality of configurations;
said optical subassembly being configured to receive a portion of the electromagnetic radiation redirected by said configurable redirecting element; said environmental device being configured to receive a portion of the electromagnetic radiation from said optical subassembly; and
said detector being configured to receive a portion of the electromagnetic radiation transmitted by said environmental device.

13. The optical imaging system of claim 12 wherein said at least one optical element is refractive.

14. The optical imaging system of claim 12 wherein said at least one optical element is reflective.

15. The optical imaging system of claim 12 wherein said configurable redirecting element is reflective.

16. The optical imaging system of claim 15 wherein said configurable redirecting element is a scanning mirror.

17. The optical imaging system of claim 12 wherein said plurality of configurations comprises a first configuration, a second configuration, and a third configuration;
said plurality of sources of electromagnetic radiation comprises a first source of electromagnetic radiation and a second source of electromagnetic radiation; said configurable redirecting element being configured to redirect a portion of the electromagnetic radiation from said optical subassembly back to said optical subassembly when said configurable redirecting element is said first configuration;
said configurable redirecting element also being configured to redirect a portion of electromagnetic radiation from said first source to said optical subassembly when said configurable redirecting element is in said second configuration; and
said configurable redirecting element also being configured to redirect a portion of electromagnetic radiation from said second source to said optical subassembly when said configurable redirecting element is in said third configuration.

* * * * *